US007277796B2

(12) United States Patent
Kuchuk et al.

(10) Patent No.: US 7,277,796 B2
(45) Date of Patent: Oct. 2, 2007

(54) SYSTEM AND METHODS OF CHARACTERIZING A HYDROCARBON RESERVOIR

(75) Inventors: Fikri Kuchuk, Truro, MA (US); Chenggang Xian, Abu Dhabi (AE); Jichao Chen, Beijing (CN); Andrew Carnegie, Abu Dhabi (AE); Peter Hegeman, Stafford, TX (US); Mustafa Onur, Istanbul (TR)

(73) Assignee: Schlumberger Technology Corporation, Houston, TX (US)

( * ) Notice: Subject to any disclaimer, the term of this patent is extended or adjusted under 35 U.S.C. 154(b) by 54 days.

(21) Appl. No.: 11/126,882

(22) Filed: May 11, 2005

(65) Prior Publication Data

US 2006/0241867 A1  Oct. 26, 2006

Related U.S. Application Data

(60) Provisional application No. 60/675,035, filed on Apr. 26, 2005.

(51) Int. Cl.
*G01V 3/32*  (2006.01)
(52) U.S. Cl. ............................................. 702/7; 702/13
(58) Field of Classification Search .................... 702/6, 702/7, 8, 9, 12, 13
See application file for complete search history.

(56) References Cited

U.S. PATENT DOCUMENTS

| | | | | |
|---|---|---|---|---|
| 5,842,149 | A * | 11/1998 | Harrell et al. | 702/9 |
| 6,609,067 | B2 * | 8/2003 | Tare et al. | 702/9 |
| 6,832,158 | B2 * | 12/2004 | Mese et al. | 702/9 |
| 6,836,731 | B1 * | 12/2004 | Whalley et al. | 702/13 |
| 2002/0177955 | A1 * | 11/2002 | Jalali et al. | 702/9 |
| 2004/0099443 | A1 * | 5/2004 | Meister et al. | 175/58 |
| 2004/0153245 | A1 * | 8/2004 | Womer et al. | 702/9 |
| 2005/0114031 | A1 * | 5/2005 | Thambynayagam et al. | 702/12 |

OTHER PUBLICATIONS

Moran, J. and Finklea, E.E.: "Theoretical Analysis of Pressure Phenomena Associated with the Wireline Formation Tester," Journal of Petroleum Technology (Aug. 1962) 899.

Goode, P.A. and Thambynayagam, R.KM.: "Permeability Determination With a Multiprobe Formation Tester," SPE Formation Evaluation (Dec. 1992) 297.

(Continued)

*Primary Examiner*—Donald E McElheny, Jr.
(74) *Attorney, Agent, or Firm*—Osha Liang LLP

(57) ABSTRACT

A technique is described for interpretation of IPTT tests. In one implementation, the technique may be configured or designed to standardize the complete interpretation procedure of IPTT in a heterogeneous reservoir, using if available, modern wireline logs (such as, for example, nuclear magnetic resonance and imaging), dynamic data from wireline formation testers and/or any other relevant information (such as, for example, geological description, core data and local knowledge) as constraints on the interpretation. Additionally, an iterative method may be used to define formation layering. An advanced regression technology may also be used to obtain optimized horizontal and vertical permeabilities of reservoir layers. Further a graphical user interface (GUI) based IPTT workflow technique of the present invention provides an integrated user-friendly interpretation platform for analyzing formation testing pressures and flow rate measurements in order to estimate the values and associated uncertainties of local characteristics of a hydrocarbon reservoir such as, for example, local permeability, local reservoir pressure, local compressibility, etc.

52 Claims, 15 Drawing Sheets
(12 of 15 Drawing Sheet(s) Filed in Color)

OTHER PUBLICATIONS

Zimmerman et al.: "Application of Emerging Wireline Formation Technologies," OSEA-90105, paper presented at the Eight Offshore Southeast Conference, Singapore, Dec. 4-7, 1990.

Goode, P.A. and Thambynayagam, R.KM.: "Influence of an Invaded Zone on a Multiple Probe Formation Tester," SPE 23030 presented at the 1991 SPE Asia-Pacific Conference, Perth, Western Australia, Nov. 4-7.

Pop, J.J. et al.: "Vertical Interference Testing With a Wireline-Conveyed Straddle-Packer Tool," paper SPE 26841 presented at the 1993 SPE Annual Technical Conference and Exhibition, Houston, TX, Oct. 3-6.

Shah, P. C., Thambynayagam, R. K. M., Pop, J. J., Pelissier-Combescure, J., and Heliot, D.: "Interpretation of the Transient Pressure Recorded by a Multiprobe Wireline Formation Tester in a Layered Reservoir", paper SPE 25663 presented at Middle East Oil Technical Conference and Exhibition, Bahrain, Apr. 3-6, 1993.

Kuchuk, F.J., Ramakrishnan, T.S., and Dave, Y.: "Interpretation of Wireline Formation Tester Packer and Probe Pressures," paper SPE 28404 presented at the 1994 SPE Annual Technical Conference and Exhibition, New Orleans, Sep. 25-28.

Al Shari, A. M., Al Ubaidan, A. A., Kibsgaard, P., and Kuchuk, F. J.: "Monitoring Area and Vertical Sweep and Reservoir Pressure in The Ghawar Field Using Multiprobe Wireline Formation Tester", paper SPE 48956 presented at the 1998 SPE Annual Technical Conference and Exhibition, New Orleans, Louisiana, Sep. 27-30, 1998.

Badaam, H., Salem Al-Matroushi, Young, N., Ayan, C., Mihcakan, M. and Kuchuk, F. J.: "Estimation of Formation Properties Using Multiprobe Formation Tester in Layered Reservoirs", paper SPE 49141 presented at 1998 SPE Annual Technical Conference and Exhibition, New Orleans, Louisiana, Sep. 27-30, 1998.

Parkes, R., Carnegie, A., Neville, T., and Hookway, S.: "New Techniques in Wireline Formation Testing in Tight Reservoirs", paper SPE 50128 presented at the 1998 SPE Asia Pacific Oil and Gas Conference and Exhibition in Perth, Australia, Oct. 1998.

Kuchuk, F. J.: "Interval Pressure Transient Testing with MDT* Packer-Probe Module in Horizontal Wells", paper SPE 39523 presented at the SPE India Oil and Gas Conference and Exhibition, New Delhi, India, Feb. 17-19, 1998.

Onur, M., and Kuchuk, F.J.: "Integrated Nonlinear Regression Analysis of Multiprobe Wireline Formation Tester Packer and Probe Pressures and Flow Rate Measurements," paper SPE 56616 presented at the 1999 SPE Annual Technical Conference and Exhibition, Houston, Oct. 3-6.

Onur, M. and Kuchuk, F.J.: "Nonlinear Regression Analysis of Well-Test Pressure Data With Uncertain Variance," paper SPE 62918 presented at the 2000 SPE Annual Technical Conference and Exhibition, Dallas, TX, Oct. 1-4.

Kuchuk, F. J., Halford, F., Hafez, H., and Zeybek, M.: "The Use of Vertical Interference Testing to Improve Reservoir Characterization", paper ADIPEC-0903 presented at the 9th Abu Dhabi International Petroleum Exhibition and Conference, Abu Dhabi, U.A.E., Oct. 15-18, 2000.

Ayan, C., Hafez, H., Hurst, S., Kuchuk, F. J., O'Callaghan, A. Peffer, J., Pop, J. J., and Zeybek, M., "Characterizing Permeability with Formation Testers", Schlumberger Oilfield Review (Autumn 2001), 2-23.

Onur, M., Hegeman, P.S., and Kuchuk, F.J.: "Pressure-Pressure Convolution Analysis of Multiprobe and Packer-Probe Wireline Formation Tester Data," paper SPE 77343 presented at the 2002 SPE Annual Technical Conference and Exhibition, San Antonio, TX, Sep. 29-Oct. 2 (published in SPE Reservoir Evaluation and Engineering, Oct. 2004, 351).

Zeybek, M., and Kuchuk, F. J.: "Fault and Fracture Characterization Using 3D Interval Pressure Transient Tests", paper SPE 78506 presented at the 10th Abu Dhabi International Petroleum Exhibition and Conference, Abu Dhabi, U.A.E., Oct. 3-16, 2002.

Gok, I.M. et al.: "Effect of an Invaded Zone on Pressure Transient Data from Multi-Probe and Packer-Probe Wireline Formation Testers in Single and Multilayer Layer Systems," paper SPE 84093 presented at the 2003 SPE Annual Technical Conference and Exhibition, Denver, CO, Oct. 5-8.

Kuchuk, F.J. and Onur, M.: "Estimating Permeability Distribution from 3D Interval Pressure Transient Tests," Journal of Petroleum Science and Engineering (2003) 39, 5.

Onur, M., Hegeman, P.S., and Kuchuk, F.J.: "Pressure-Transient Analysis of Dual Packer-Probe Wireline Formation Testers in Slanted Wells," paper SPE 90250 presented at the 2004 SPE Annual Technical Conference and Exhibition, Houston, TX, USA, Sep. 26-29.

Xian, C., Carnegie, C., Al Raisi, M. R., Petricola, M., Chen, J., "An Integrated Efficient Approach To Perform IPTT Interpretation", paper SPE 88561 presented at the 2004 SPE Asia Pacific Oil and Gas Conference and Exhibition, Perth, Australia, Oct. 18-20, 2004.

Mullins, O. C., Hashem, M., Elshahawi, H., Fujisawa, G., Dong, C., Betancourt1, C., Terabayashi, T.: "Hydrocarbon Compositional Analysis In-situ In Openhole Wireline Logging", paper presented at the SPWLA 45th Annual Logging Symposium, Noordwijk, The Netherlands, Jun. 6-9, 2004.

\* cited by examiner

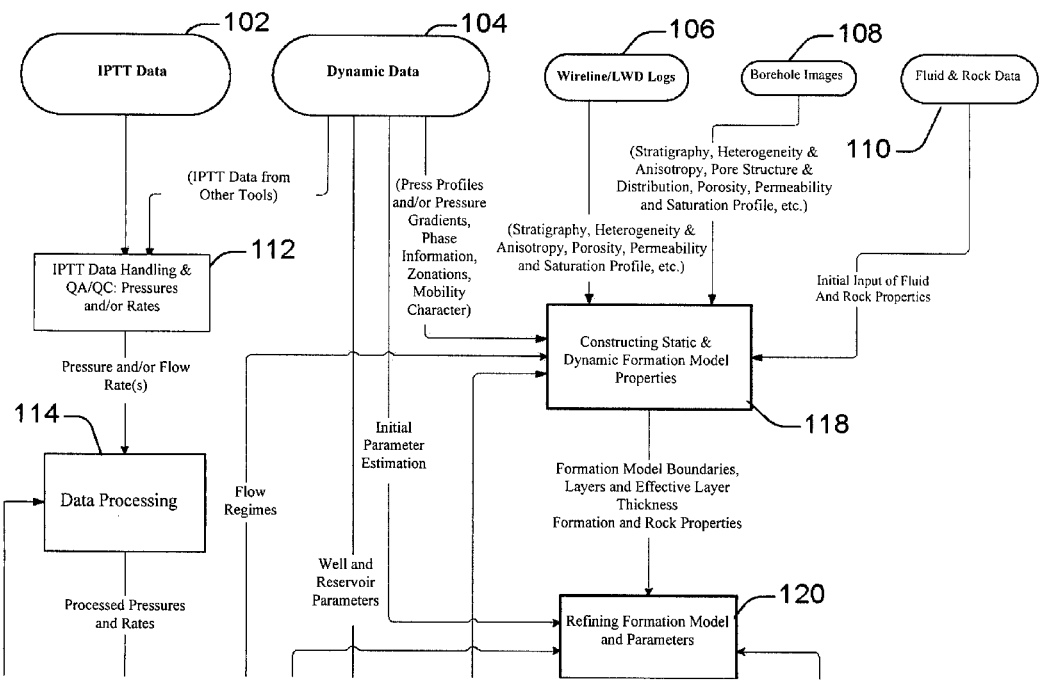
Fig. 1 (Part I)

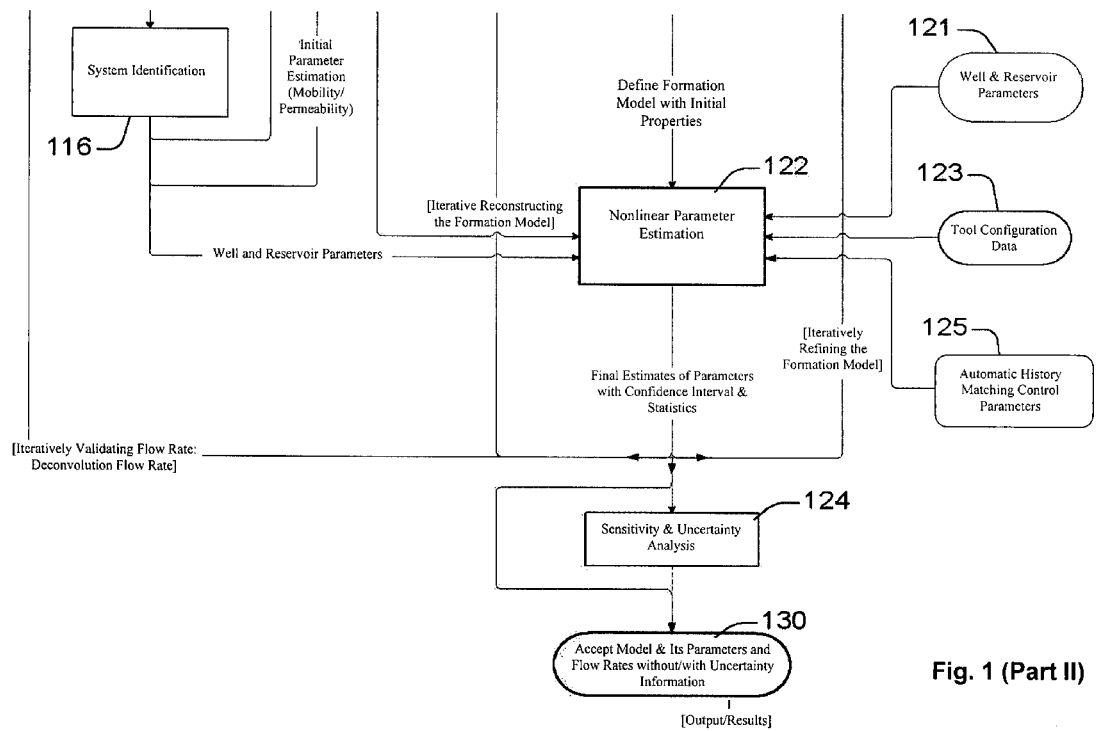
Fig. 1 (Part II)

SYSTEM AND METHODS OF CHARACTERIZING A HYDROCARBON RESERVOIR

RELATED APPLICATION DATA

The patent application claims priority under 35 U.S.C. § 119 to U.S. Provisional Application Ser. No. 60/675,035, naming F. Kuchuk, C. Xian, J. Chen, A. Carnegie, P. Hegeman and M. Onur as inventors, and filed Apr. 26, 2005, which is incorporated herein by reference in its entirety for all purposes.

BACKGROUND OF THE INVENTION

In any oil field exploration and development, indirect measurements such as detailed geological description, outcrop data, etc., and direct measurements such as seismic, cores, logs, and fluid samples, etc., provide useful information for static and dynamic reservoir description, simulation, and forecasting. Besides being static, core and log data delineate only the vicinity of the wellbore, and geological and seismic data usually are not directly related to formation permeability. Because they are dynamic and direct, pressure measurements and interval (local) transient tests provide information about reservoir pressure and permeability distributions, and fluid samples for well productivity and dynamic reservoir description, and therefore are useful for exploration as well as for production and reservoir engineering. For exploration, pressure measurements and interval tests may simply show that the formation can flow and permit sampling of the formation fluid and provide productivity index, reservoir pressure, permeability, and data for heterogeneity.

Permeability is an important parameter when dealing with reservoir management and well performance. Because of its direct effects on well productivity and many reservoir displacement processes, the determination of permeability and permeability anisotropy are becoming increasingly important as emphasis shifts from primary to secondary and tertiary recovery mechanisms. In the past, conventional wireline formation testers (WFT) have traditionally been used to obtain formation pressure and permeability distributions in the formation along the wellbore. More recently, improvements in wireline formation testers have made it possible to conduct local production, buildup, and interference tests, which is commonly referred to as interval pressure transient testing (IPTT) or vertical interference tests. These tests are usually conducted with a WFT including a single probe, dual-packer, or dual-probe and/or any combination of them, such as multiprobe or dual-packer and multiprobe probe combinations. Conventional IPTT tests have traditionally been used to obtain spatial distributions of the formation permeability and pressure. The tensorial permeability distributions of the formation typically includes two components, namely horizontal and vertical permeabilities in the near-well formation, typically with in a range up to one hundred feet However, for pressure transient interval test (IPTT) design, implementation, and interpretation, there is currently no integrated systematic procedure and/or program which may be used to obtain spatial distributions of the formation permeability and pressure. Rather, using conventional techniques, more than six different programs and/or algorithms are typically used to obtain spatial distributions of the formation permeability and pressure. Moreover, many of the conventional programs used to generate such estimates are implemented using DOS based software and typically or designed to perform only isolated tasks relating to permeability and/or pressure calculations. As a result, a considerable amount of time is spent on non-productive tasks such as, for example, importing/exporting data from one platform to another. A considerable amount of additional time may then be required to build geological and reservoir models for permeability inversion, which are typically built manually from other geoscience data (logs, local geology, etc.). Accordingly, it will be appreciated that there exists a need to improve systematic procedures and algorithms relating to IPTT design, implementation, and interpretation in order to provide for improved efficiency and resource utilization as well as reliable estimates of spatial formation permeability and pressure distributions.

SUMMARY OF THE INVENTION

According to different embodiments of the present invention, various methods, systems and computer program products are described for calculating characteristics of a hydrocarbon reservoir. Pressure data representing local pressure measurements obtained at one or more locations along at least one borehole traversing the hydrocarbon reservoir is received. Input data from the user is received via a first computer graphical user interface. One or more local characteristics of the hydrocarbon reservoir (such as, for example, spatial formation permeability, pressure distributions, local compressibility, etc.) may then be calculated based at least in part on the pressure data and the user input.

According to a specific embodiment, dynamic data associated with measurements obtained at one or more locations along at least one borehole traversing the hydrocarbon reservoir may also be received. The dynamic data may include, for example, pretest survey data from formation testers, well testing data, multiphase fluid information from downhole fluid analysis (DFA), production logging data, reservoir saturation tool (RST) data, etc. The calculation of at least one of the local characteristics may be based at least in part on at least a portion of the received dynamic data. Additionally, in at least one embodiment, additional input parameters may be received including, for example, formation model information and associated properties, well model information and associated properties, well and reservoir properties, tool configuration data, history matching (e.g., non-linear estimation) control parameters, etc. The calculation of at least one of the local characteristics may be based at least in part on at least one of the additional input parameters.

In at least one implementation, the graphical user interface (GUI) may include functionality for facilitating the user in performing data processing operations such as, for example, removing superfluous data, denoising (e.g., noise removal) and/or noise filtering, rate manipulating, constructing or reconstructing missing information, and decimating. The GUI may also include functionality for facilitating the user in performing system identification and/or flow regime analysis operations such as, for example, derivatives, Pressure-Pressure deconvolutions, Pressure-Flow Rate deconvolutions, etc. Further, the GUI may also include functionality for facilitating the user in performing formation model building (e.g., construction) operations used to generate formation model information relating one or more formation characteristics such as, for example, individual formation layer depth, effective porosity, effective horizontal permeability, effective vertical permeability, total compressibility, effective viscosity, etc. Additionally, the GUI may also include functionality for facilitating the user in performing nonlinear parameter estimation operations such as, for example, adjusting estimates of at least one formation layer parameter, adjusting estimates of at least one formation layer boundary, redefining one or more selected formation layers, changing selected initial estimates of at least one formation layer, etc.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIG. 1 shows an example of a specific embodiment of an IPTT flow diagram which may be used for implementing various aspects of the present invention.

DETAILED DESCRIPTION OF THE PREFERRED EMBODIMENTS

Figure 2:
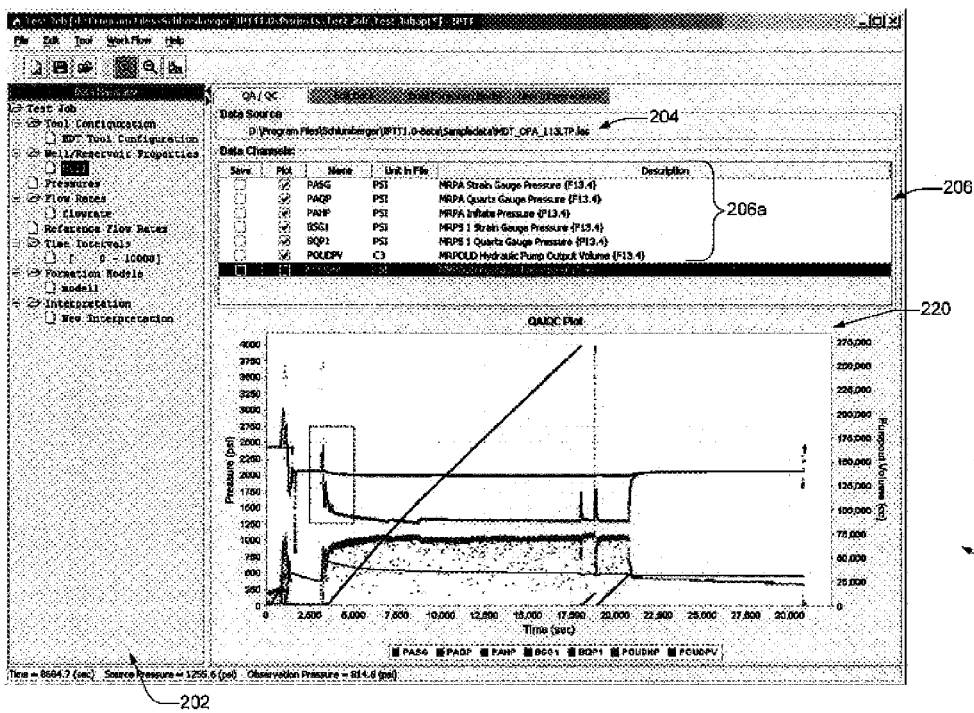
FIGS. 2-3 illustrate examples of different screenshots of a specific embodiment of the invention which may be used for implementing functionality relating to the IPTT Data Handling And QA/QC Process 112 of FIG. 1.

In order to obtain estimates of spatial formation permeability and pressure (parameters) distributions in a cost-effective an time-efficient manner, a graphical user interface (GUI) is used for facilitating Interval Pressure Transient Testing (IPTT) techniques used to provide an integrated user-friendly interpretation platform for analyzing formation testing pressure and flow rate measurements. In addition to spatial parameter estimates, such as pressure, effective vertical and horizontal permeabilities and damage skin factor for individual layers of a geologic formation, associated uncertainties in estimates are also obtained from the IPTT interpretation platform of the invention. According to specific embodiments, the technique of the present invention is able to provide seamless workflow from openhole logs, model building, to inversion of spatial parameters, such as permeability. According to at least one embodiment, the IPTT software and GUI of the present invention enable the user to build 3-D reservoir (formation or geological strata) models starting from openhole logs. In specific implementations, the present invention incorporates formation information from openhole logs and borehole images and creates a reservoir flow model for formation testing tested zones. The present invention may be configured or designed to also perform optimization using a nonlinear regression technique such as, for example, a maximum likelihood method for simultaneous estimation of all unknown spatial parameters, including, for example, sandface flow rate (if this parameter is not measured accurately). Additionally, the present invention may also be configured or designed to estimate a producing interval associated skin, which, for example, may provide information relating to formation cleanup characteristics.

According to a specific implementation, the present invention may be configured or designed to provide optimized workflows including, for example, integrating petrophysical data, building static reservoir models, and permeability inversions. Once the desired unknown spatial formation parameters are estimated, present invention may then generate a formation testing interpretation report. According to a specific embodiment, the estimated formation parameters may be imported into a single well predictive model for productivity determination and well completion as well as well performance prediction.

In at least one embodiment, the present invention may be configured or designed to provide efficient and accurate determination of one or more of the following spatial formation parameters such as, for example, Reservoir Pressure (Pres), Vertical Permeability ($k_v$), Horizontal Permeability ($k_h$), Skin (S), Product of Porosity and Compressibility ($\phi c_t$), etc. According to a specific embodiment, such parameters may be computed using data relating to pressure measurements and flow rates which have been acquired during Interval Pressure Transient Tests (IPTT) performed by a formation tester conveyed by wireline, slickline, and/or drilling string while drilling.

FIG. 1 shows an example of a specific embodiment of an IPTT flow diagram which may be used for implementing various aspects of the present invention. In the example of FIG. 1, major tasks and steps (called process) are numbered from 102 to 130. This IPTT flow diagram represents the procedure and underling programs of a specific embodiment of the invention, in which one or more tasks may be used for IPTT designing, conducting, and interpretation to obtain reliable estimates of spatial formation permeability and pressure distributions.

According to a specific embodiment, the IPTT flow diagram of FIG. 1 may be implemented using an integrated software and/or hardware system which is configured or designed to provide a plurality of graphical user interfaces for providing an integrated workflow which may include, for example, integration of petrophysical data; building of static reservoir models and permeability inversions; generation of estimated formation parameters; generation of a single well predictive model, etc. Examples of at least a portion of such graphical user interfaces are illustrated in FIGS. 1-13 of the drawings, which are described in greater detail below.

As illustrated in the embodiment of FIG. 1, the software and/or hardware systems of the present invention may be configured or designed to implement a variety of different processes (e.g., 112, 114, 116, 118, 120, 122, 124, etc.) which may be utilized to provide functionality relating to the above-described integrated workflow. At least a portion of these processes are described in greater detail below.

IPTT Data Handling and QA/QC

As illustrated in the embodiment of FIG. 1, the IPTT workflow may include an IPTT Data Handling And QA/QC Process 112 which is configured or designed to receive input data such as, for example, IPTT data 102, dynamic data 104, etc. According to a specific embodiment, IPTT data may include real time and/or post-job data such as, for example, pressures, multiple phase rates from Wireline and/or LWD formation testers, etc. Dynamic data may include real-time and/or post-job data such as, for example, pretest survey data from the formation testers; well testing data; multiple phase information from downhole fluid analysis (DFA); reservoir saturation data from openhole and/or casedhole resistivity-induction tools; production logging data; reservoir saturation data from casing saturation tools such as the Reservoir Saturation Tool (RST) and/or the Cased Hole Formation Resistivity (CHFR) Tool; and/or other IPTT related data from other tools and services for general formation and reservoir evaluations.

According to specific embodiments of the present invention, the IPTT and dynamic input data may be obtained from real time systems, databases, third party software, archived files, etc. According to a specific implementation, IPTT Data Handling And QA/QC Process 112 may be configured or designed to handle the connecting/loading of data from different sources.

In at least one implementation, input data for the IPTT Data Handling And QA/QC Process may include pressure (s), flow rate(s), well properties, reservoir fluid and rock properties, etc. In addition to interpretation, the dynamic data channels are also used for test designing, real-time test designing and conducting, quality assurance and quality check (QA/QC) of the test at the wellsite, etc. According to one implementation, additional accessory data channels may be provided for QA/QC functionality.

According to a specific embodiment, the IPTT Data Handling And QA/QC Process 112 may be configured or designed to analyze dynamic measurements and monitoring, tool conditions (e.g. gauges, solenoids, pump(s), electricity, optical sensors, etc.), and/or associated responses (e.g. pumped volume, motor speed, power current, oil/water fractions, resistivity, temperature, etc.) in order to understand overall testing sequences and events and to ensure proper test duration and validity of the data.

Data from IPTT testing may also be combined with other data from downhole fluid analysis (DFA) and downhole sampling and formation fracturing. According to a specific implementation, a complete testing procedure may be tested and carried out using the IPTT workflow of the present invention which may be linked to the downhole testing hardware in order to conduct IPTT dynamic tests and to collect valid data in both real time and memory mode.

It may be understood that sometimes downhole well and near-wellbore conditions may be severe (e.g. washout, loose sands or weak rocks, high mud solids, fractures, etc), which might complicate the testing and data acquisition. Therefore, for formation parameter estimation, the IPTT Data Handling And QA/QC Process may be configured or designed to provide the following functionality: 1) Data management, 2) IPTT data validation, 3) IPTT data quality assurance and checkup, and 4) The testing (drawdown & buildup) cycle designation. According to a specific implementation, one purpose of the QA/QC functionality of the IPTT Data Handling And QA/QC Process is to diagnose and understand wellbore, formation, and/or tool related issues. This information may be used to help engineers to optimize the operating procedure and testing sequences, and to diagnose formation related issues.

Additionally the QA/QC functionality provides a methodology for the interpreters to more accurately assess the general data quality, testing sequences and events. This methodology facilitates proper operation of the Data Processing Process 114. Moreover, the QA/QC functionality facilitates the interpreters in identifying and/or validating desired drawdown and buildup tests which may be used for system identification, flow regime analyses, and nonlinear parameter estimation.

Figure 3:
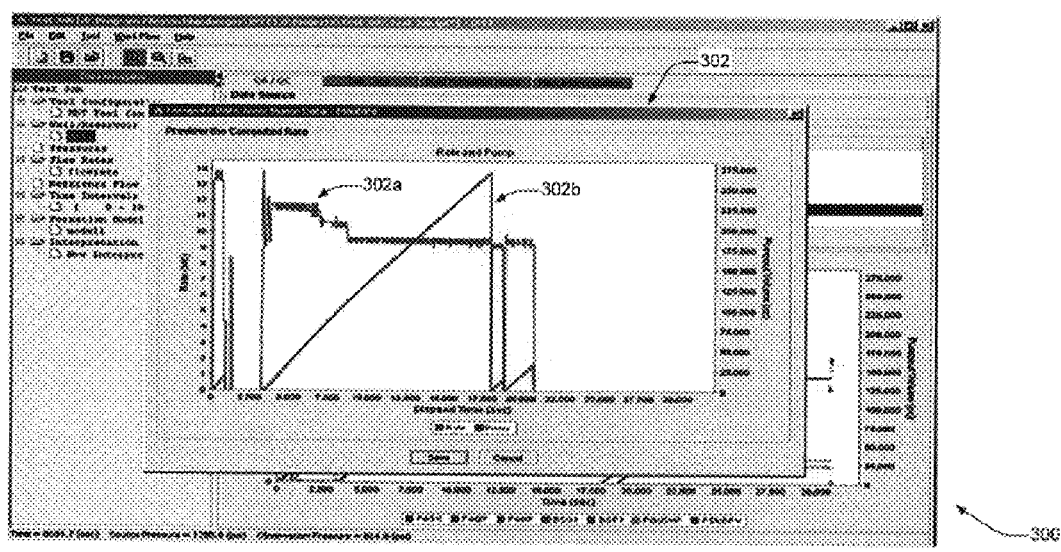

FIGS. 2-3 illustrate examples of different screenshots from a specific embodiment of the invention which may be used for implementing functionality relating to the IPTT Data Handling And QA/QC Process 112 of FIG. 1.

FIG. 2 illustrates an example of a QA/QC graphical user interface (GUI) 200, in accordance with a specific embodiment of the present invention. In the example of FIG. 2 it is assumed that the IPTT software is configured or designed to read test data from external files. The user may plot data channels from the external files, for example, to check the data quality and to select pressure data of desired quality for interpretation.

As illustrated in FIG. 2, GUI 200 may include a data navigator window 202 for allowing the user to explore data relating to the current job. An external data path selection window 204 may be provided for allowing the user to select and view the external data path associated with the data source. A data channel display window 206 may be provided for allowing the user to select desired data channels 206a to be displayed. According to a specific implementation, the channels displayed in the window 206 are read from the source which is specified in the external data path selection window 204. A QA/QC plot area window 220 may be provided for allowing the IPTT software to plot and display selected data channels on this plot, for example, for quality control purposes. According to a specific implementation, the data channels which are displayed in window 220 have been selected by the user in window 206. In one implementation the display of the selected data channels may be plotted as a function of pressure versus time. Additionally, functionality may be provided to allow the user to zoom selected areas on the plot(s) in order, for example, to check the data quality in greater detail.

FIG. 3 illustrates an example of a GUI 300 configured or designed to provide functionality relating to plotting of the computed flow rate. For example, in one implementation the IPTT workflow software computes flow rate from the pump-out volume. As illustrated in the GUI 300, both pump volume and computed flow rate are plotted together versus time in window 302. More specifically, plot 302a corresponds to the computed flow rate versus time, and plot 302b corresponds to the pump volume versus time. According to different embodiments, a variety of different algorithms may be used to compute the flow rate. For example, in a specific implementation, an algorithm commonly referred to as the Superflow algorithm may be used to compute the flow rate.

Data Processing

As illustrated in FIG. 1, the IPTT workflow may include a Data Processing Process 114 which may be configured or designed to perform a variety of operations such as, for example, minimizing IPTT data interpretation and computer execution time, verifying completeness of the dynamic formation data and well behavior data, etc. According to a specific implementation, the Data Processing Process 114 may be configured or designed to perform one or more of the following operations: removing superfluous data, denoising or noise filtering, rate manipulating (e.g., smoothing, interpolating, splitting, etc.), constructing/reconstructing missing information, decimating, etc.

According to a specific embodiment, in order to minimize the nonlinear regression execution time, the actual data points may be reduced in order to help bring the data set to a manageable number of data points, which, for example, may be based on expected complexity of the formation and/or also computing power. According to a specific implementation, it may be desirable to process sufficient dynamic data points to perform nonlinear regression without missing any details of well and formation information. According to a specific implementation, a decimating procedure based on pressure difference is preferably use. However other types of decimation algorithms can be alternatively used such as those based on flow rate, or based on logarithmic or a Cartesian-type selection process.

Typically, flow rate data is often measured accurately using real-time pumpout data or Flow Control Modules. However, in some cases (due, for example, to sampling and test requirements, specific tool configurations to achieve other objectives, and/or tool operational issues) flow rate data is not measured either directly or accurately. Accordingly, a number of different techniques (such as, for example, the Superflow algorithm) may be used to compute the flow rate data. According to a specific implementation, the Data Processing Process 114 may be configured or designed to include rate manipulating functionality which may be utilized to process (e.g. smoothing, interpolating, splitting, merging, etc) the flow rate data.

According to a specific embodiment, diagnostic plots (e.g., log-log graph of pressure, convolution, deconvolved pressure derivatives, and/or G-function versus time or time functions) may be used to check the quality of data processing and the degree of data decimating. A thorough data processing technique should preferably not distort well and formation pressure transient characteristics, such as, for example, semi-log, log-log derivative and G-function, for the system identification. According to a specific implementation, after pressure decimating, the changes of flow rates should preferably be synchronized with the decimated pressures.

Because accurate downhole flow rate data is important, functionality may be provided in the Data Processing Process 114 to validate the input flow rate so as to minimize the probable uncertainties in system identification and/or parameter estimation. According to a specific implementation, this flow rate estimating and validating procedure may be based on deconvolution of one or more of the measured pressure data, for example, from sink probe and packer module(s), and/or estimated pressures from well and reservoir model(s) (with estimated parameters obtained, for example, from Nonlinear Parameter Estimation). The computed flow rate from this procedure may then be compared with either measured or estimated flow rate (e.g., flow rate computed from pump displacement). A significant deviation between the input rate and the computed rate might suggest that either the model with its parameters is incorrect or the input flow rate is inaccurate. Accordingly, in at least one implementation, the interpretation may continue until this discrepancy is resolved.

Figure 4:
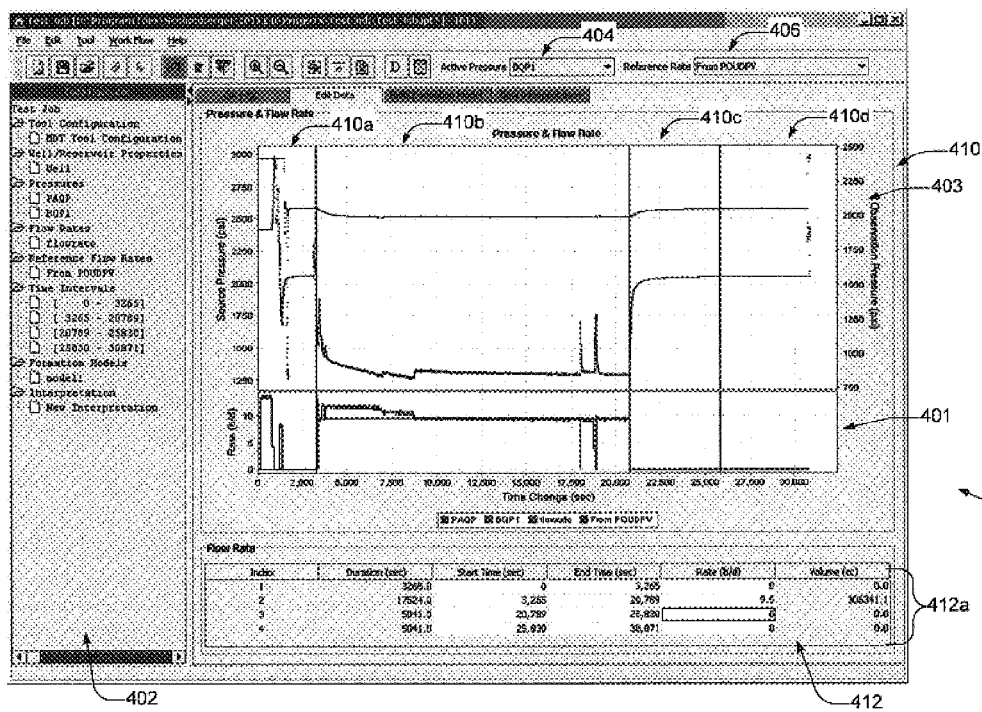
FIGS. 4-6 illustrate examples of different screenshots of a specific embodiment of the invention which may be used for implementing functionality relating to the Data Processing Process 114 of FIG. 1.
Figure 5:
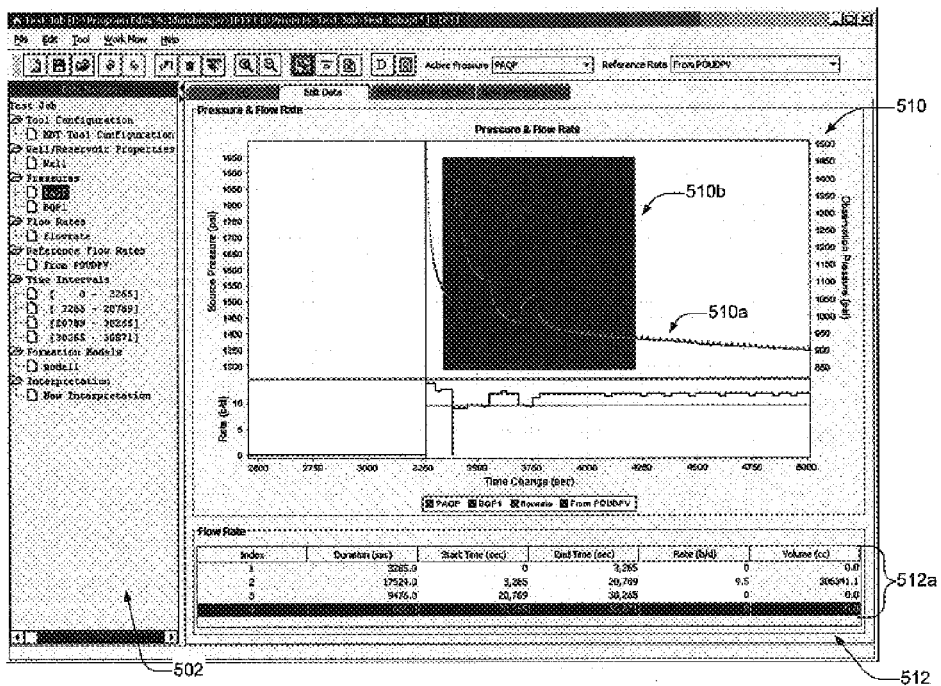
Figure 6:
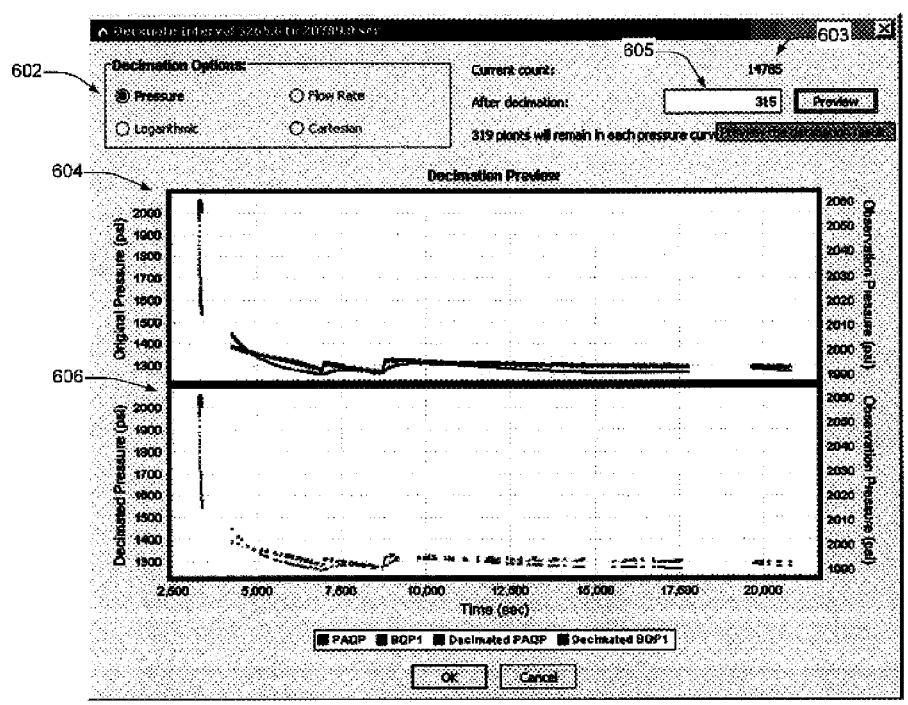

FIGS. 4-6 illustrate examples of different screenshots which may be used for implementing functionality relating to the Data Processing Process 114 of FIG. 1.

FIG. 4 illustrates an example of a GUI 400 configured or designed to provide functionality for editing pressure and flow rate data. As illustrated in FIG. 4, GUI 400 may include a data navigator window 402 for allowing a user to explore data relating to the current job. A plot display window 410 may be configured or designed to display stacked plots of desired data. In the example of FIG. 4, window 410 shows stacked plots of pressure versus time (403) and flow rate versus time (401) data. The user may modify/remove/decimate pressure data and/or split/merge the flow rate. According to a specific implementation, the user may divide the plotted data into several intervals (e.g., 410a, 410b, 410c, 410d) based on specific events. In one implementation data operations (such as, for example, data decimation) may be performed interval by interval based on test time.

As illustrated in the example of FIG. 4, an active pressure selection box 404 may be provided for allowing the user to select desired pressure information for editing. According to a specific implementation, the user may plot multiple channel pressure data together, but only one pressure data set may be active for editing at any one time.

A reference rate selection box 406 may be provided for allowing the user to select desired reference pressure(s) to plot in the flow rate plot 401. According to a specific implementation, the reference flow rate may be computed from the pump data or from regression data (described in greater detail, for example, with respect to the Nonlinear Parameter Estimation Process 1422).

A flow rate window 412 may be provided for displaying and editing desired flow rate data. As illustrated in FIG. 4, the flow rate window 412 may include a table 412a of flow rate information such as, for example, start time, end time, rate value, volume, etc. According to a specific implementation, the flow rate window 412 may provide functionality for allowing the user to edit flow rate information in the flow rate table 412a.

FIG. 5 illustrates an example of a GUI 500 configured or designed to provide functionality for editing data. In at least one implementation, the GUI 500 of FIG. 5 includes functionality similar to the GUI 400 of FIG. 4, described above. In the example of FIG. 5, it is assumed that the user has selected a portion (e.g., time interval) 510b of the pressure data for editing. According to a specific implementation, the user may delete or edit the selected data points within the selected portion 510b.

FIG. 6 illustrates an example of a GUI 600 configured or designed to provide decimation functionality for pressure data. According to a specific implementation, one purpose of decimation is to reduce the data points to perform parameter estimation efficiently without missing any details of well and formation information, while maintaining the characteristic transient features of the well and formation. In the example of FIG. 6, multiple decimation methods are provided in decimation option window 602. According to a specific implementation, the user may preview the decimation results after inputting the expected data points in input box 605.

As illustrated in the example of FIG. 6, GUI 600 may include current data point count information 603 corresponding to the number of current data points in the selected data interval. Additionally, as illustrated in FIG. 6, GUI 600 may include decimation preview functionality for displaying, for example, a pressure vs. time plot 604 before the decimation and/or a pressure vs. time plot 606 after the decimation.

System Identification

As illustrated in FIG. 1, the IPTT workflow may include a System Identification Process 116 which may be configured or designed to perform a variety of operations such as, for example, derivatives, pressure-rate (p-r) deconvolution, pressure-pressure (p-p) deconvolution, Flow Regime Analysis (e.g., log-log, semi-log, etc), etc.

According to a specific embodiment, specific pressure transient flow regimes may be used for model (system) identification and flow regime analyses. For example, a stabilized derivative on a log-log plot provides an indication of the infinite acting radial flow regime from which certain characteristics of well and formation are inferred, and a number of well and formation parameters are calculated. Additionally, the System Identification Process 116 may be configured or designed to provide useful information about layer boundaries, fractures, faults, etc.

In at least one implementation, the transient flow regime analysis may be performed using semi-log and/or log-log plots of either pressure changes or derivatives. For example, the −½ slope and/or the flat (zero) slope might appear on the derivative curve of the log-log plot, which might suggest the existence of the spherical regime and/or radial flow regime. In one implementation, the conventional diagnostic method may be enhanced and/or complemented with either pressure-rate (p-r) and/or pressure-pressure (p-p) deconvolution. In one implementation the p-p deconvolution may be based on the use of different pressure-data sets recorded at two or more different spatial locations, thereby enabling the System Identification Process to perform system identification operations (e.g., flow regime analysis) that are independent of flow rate data. This may also provide an indication of the accuracy of the flow rate measurements. According to a specific implementation, G-function(s) associated with various p-p deconvolutions for different probe-probe and packer-probe configurations may be used for parameter estimation and/or for understanding non-uniqueness issues.

According to a specific embodiment, if the system being analyzed is substantially homogeneous (which is typically unusual, particularly in carbonate reservoirs) and unbounded, the derivatives of sink (interval) and observation probe(s) should be substantially overlaid together on the minus (negative) half-slope line (spherical flow regime). There may be some difference between the sink source and observation probe derivatives if there is any permeability variation from the sink (interval) toward the observation probe(s). Thus, for example, instead of overlaying together on the negative half-slope line, the derivatives of sink (or packer) and observation probe(s) will most likely have separation which can possibly be due to some layering in the vertical direction and/or due to faults or filled fractures along the well. This information is useful for identifying the system and for defining/refining the formation model, which may provide further clues about the degree of heterogeneity.

In addition to flow regime identification and analysis, mobility/permeability across the tested zone may be estimated using conventional pressure transient analysis. For example, if information relating to a given spherical flow regime is known, then the spherical mobility/permeability of the tested zone may be determined. For some systems, provided that the test is conducted long enough, it may be possible to observe both spherical and radial flow regimes. In such cases, both horizontal permeability $k_h$ and vertical permeability $k_v$ may be obtained.

In situations where it is determined that flow rate data is not reliable, pressure-pressure (p-p) convolution techniques may be used to estimate mobility/permeability, for example, from specific flow regimes mentioned above. According to a specific implementation, the p-p convolution technique may utilize different pressure-data sets to perform parameter estimation without flow rate. For multi-probe tests in vertical wells in single-layer systems, vertical probe pressures (based, for example, on the p-p convolution combinations) may be matched with both horizontal and sink probe pressure information to provide unique estimates of reservoir pressure, horizontal and vertical permeabilities/mobilities, skin, etc. For packer-probe tests in vertical wells in single-layer systems, p-p convolution of vertical probe pressures from packer-interval pressures may be used to provide unique estimate of reservoir pressure, horizontal and vertical permeabilities/mobilities, skin, etc.

Constructing Static and Dynamic Formation Model

According to a specific embodiment, the IPTT workflow of the present invention may utilize a formation model, which may include layers with distinct flow parameters. For example, as illustrated in FIG. 1, the IPTT workflow may include a Constructing Static And Dynamic Formation Model Process 118 which may be configured or designed to perform a variety of operations such as, for example, modeling operations relating to boundary and layer definitions, in-homogeneity consideration (e.g., fractures, faults, dips, etc), formation and rock properties, etc.

According to a specific implementation, specific rock (i.e. petrophysical) and fluid parameters may be defined for each layer. Such definitions may include, for example:

Depth, $D_b$ and $D_t$, of the bottom and top of each layer to determine thickness and the position relative to the tool;

Total Effective porosity, $\phi$, of the layer;

Effective horizontal permeability, $k_h$, of the layer;

Effective vertical permeability, $k_v$, of the layer;

Total compressibility, $c_t$, of the layer;

Effective viscosity, $\mu$, of the flowing fluid in the layer.

According to specific embodiments, data which may be used to derive one or more of the above parameters may be obtained from one or more of the following sources.

Dynamic downhole data (e.g., 104) such as, for example, downhole measurements of fluid flow, fluid properties and/or pressure changes within the reservoir, pressure profiles and/or pressure gradients, phase information, zonations, mobility characteristics, stratigraphy, heterogeneity and anisotropy, porosity, permeability and saturation profiles, etc. According to a specific implementation, formation testers such as, for example, Schlumberger's Modular Formation Dynamics Tester (MDT) and production logging are possible sources for such data.

Static downhole data (e.g., 106) such as, for example, downhole measurements of reservoir properties which are not significantly affected by fluid flow and/or pressure changes. Such measurements may include, for example, wireline logs such as those of resistivity, nuclear magnetic resonance, sonic; transforms of wireline log data which estimate static parameters, such as porosity, fluid saturations, pore-throat geometry, rock strengths, rock textures and lithofacies, compressibility, dips, etc; stratigraphy; heterogeneity and anisotropy; pore structure and distribution; porosity and permeability profiles; etc.

Information from borehole images (e.g., 108) such as, for example, stratigraphy; heterogeneity and anisotropy; fractures, faults, dips; pore structure and distribution; porosity and permeability profiles; etc.

Surface measurements of fluid properties (e.g., 110) such as, for example, lab measurements PVT properties such as, for example, fluid composition and viscosity.

Surface measurements of static parameters (e.g., 110) such as, for example, core properties, viscosity, porosity, compressibility, permeability, sonic travel times, rock types, etc.

Background knowledge of reservoir and geoscience data. For example, if measurements from at least some of the above-described source data do not show distinct layers, it may be known from general experience of the reservoir behavior how the reservoir should be divided into layers for IPTT interpretation.

Soft data such as the interpreter's (e.g., user's) knowledge and experience.

According to at least one embodiment, the above-described source measurements need not necessarily be made in the well being tested. For example, it is possible that some of the measurements may be performed in other wells (e.g., generally neighboring wells), which will have been considered to be analogous in some way to the well being tested.

Generally, a number of different techniques may be used for performing model construction. According to one implementation, a first step in performing model construction may include defining the number of layers, N, and the associated $D_b i$, $D_t i$, for i=1, ..., N (layer bottom and top depths) which are to be used initially. This may be accomplished, for example, by determining how the available data from some or all of the above-described source categories varies with depth, and hence whether any layering may be detected.

A variety of conventional techniques are generally known for using static information such as openhole logs and borehole images to define the layering or reservoir model. According to a specific implementation, such techniques should preferably be integrated with layering inferred from dynamic data.

In addition to static data, dynamic data may also be used to refine and confirm possible layering, non-homogeneities, heterogeneities, etc. The following discussion describes different techniques for using dynamic data, such as that acquired by formation testing, to refine and confirm possible layering and other non-homogeneities (such as, for example, faults and fractures) when the initial reservoir model is defined according to static geoscience data.

Pretest and Pretest Mobilities

According to specific implementations, a pretest may refer to the operation performed by a formation tester with an objective of measuring reservoir pressure and establishing hydraulic communication between the tool and formation. In one implementation, a pretest may include withdrawing relatively small volumes of fluid from the formation to create a drawdown, and then buildup. Pretests may be conducted with a probe or a dual packer. MDT pretests may also provide certain information about formation layering. Examples of different types of pretests include:

Dry tests which may be used to reveal the presence of a potential barrier (especially if the pretests are reasonably closely spaced).

Lost Seal tests which may be used to suggest fracturing around the tested area. Caliper logs may also be checked because borehole washout conditions may be a contributing factor to Lost Seal detection.

MDT probe pretests may be used to measure matrix permeability of the reservoir in the presence of fractures.

Pretest mobilities may be used to provide a good indication of formation producibility (e.g., permeability) and/ or permeability contrast if the reservoir is not natural fractured or if the reservoir is without strong dual porosity/permeability features.

Pressures and Pressure Gradients

Pressure gradients obtained from pretests or IPTTs may be used, for example, to identify fluid types (gas, oil, and water) in the formation, and to identify or measure depletion and/or vertical barriers. Even in depleted or flushed reservoirs, pressures may still provide an acceptable indication of vertical communication and certain large-scale inhomogeneities such as, for example, faults and compartmentalization. 'Supercharged' pressure points with low formation mobility may be used to reveal the presence of low productivity layers (especially if the pressure points are fairly closely spaced).

Downhole Fluid Analysis and Samples

MDT downhole fluid analysis may be used to determine fluid types, hydrocarbon compositions, GOR, water cut, etc. The results from downhole fluid analysis and samples may provide direct information about flow units and fluid properties.

Transient Flow Regimes of MDT Packer and Probes

According to a specific embodiment, transient flow regimes may be checked for flowing boundaries using, for example, MDT Packer and Probe pressure data.

Refining Formation Model and Parameters

As illustrated in FIG. 1, the IPTT workflow may include a Refining Formation Model And Parameters Process 120 which may be configured or designed to perform a variety of operations such as, for example, conditioning, calibrating, scaling, range and weight assigning, etc. According to a specific embodiment, once the formation model is defined as described in the Constructing Static And Dynamic Formation Model Process 118, the effective horizontal and vertical permeabilities of some of the layers may be improved, for example, by (1) performing interpretation of individual components of pressure transient data, such as that acquired while performing the System Identification Process 116; and/or by (2) updating some of the permeabilities of the layers with values determined through a Regression Process (such as that described in greater detail below with respect to Process 122 of FIG. 1). These improved permeabilities may then be used to provide more accurate initial estimates for the regression process and/or to provide constraints on how much the permeabilities may be varied in certain layers, e.g., during the regression.

The following discussion relates to different techniques which may be used in performing interpretation of individual components of pressure transient data.

Pretest Drawdown Mobilities/Permeabilities

According to specific embodiments, during at least some pretests performed with a formation tester (such as, for example, the MDT), a small volume of fluid is withdrawn from the formation. This creates a small drawdown and build up. The drawdown may be analyzed to obtain a mobility value, which is associated with a desired depth of investigation (which may be measured, for example, relative to the distance from the formation tester probe). If the viscosity of the fluid being withdrawn from the formation is known, the mobility may be converted to a permeability value.

According to a specific embodiment, if there is sufficient pretest information relating to a layer being analyzed, then in an unfractured system, an initial estimate of $k_h$ and $k_v$ of the defined permeable layers may be made using, for example, arithmetic and harmonic averages of the pretest permeabilities. According to a specific implementation, the arithmetic average technique may be desirable for estimating the horizontal permeability; and the harmonic average technique may be desirable for estimating the vertical permeability.

It will be pointed out that, when compared with the effective formation permeability of the whole flow unit (producing strata), the average $k_h$ and $k_v$ of layers from pretest permeabilities may be optimistic. This may be particularly evident in tight formations because almost all pretest points are typically chosen at locations having potentially high expected permeabilities (often based on openhole logs) in order, for example, to have a flow to obtain reservoir pressure. In this case, a "Scaling Factor" (e.g., a value greater than one) may be used to ensure that the average pretest permeabilities $k_h$ and $k_v$ of the layer where the packer was set are adjusted to values as close as possible to the packer buildup permeabilities. In alternate embodiments a scaling factor of a value less than one may be appropriate, for example, if the damage zone effective permeability is significantly less than the formation permeability. In either case, the approximate determination of the scaling factor may be performed by comparing the permeability derived from packer transient data against the average permeabilities derived from pretests.

Another possible method may be to decluster the pretest permeabilities before averaging them. An example of this approach may be applied in cases where the pressure responses of a single probe pretest data are mainly dominated by matrix permeability. For example, if the average permeability of a layer (derived from pretests) is substantially less than that derived from the packer pressure transients acquired in the same layer, it might imply the zonal effective permeability is enhanced by high permeability streaks such as those created by fractures, vugs, and/or high permeability lenses. Except for such cases, $k_h$ and $k_v$ values which are derived from pretest drawdown permeabilities typically prove to be good indicators of the initial estimates of permeabilities, particularly when there are sufficient numbers pretest points in the tested layers. It should also be noted that, it at least some embodiments, the ratio of these quantities may be used to determine the initial estimates of the expected permeability anisotropy ($k_h/k_v$) in a permeable zone, regardless of whether the average horizontal and vertical pretest permeabilities need to be scaled by some factor.

Packer Transient Analysis

The dual packer of a formation tester when it is used as the sink (e.g., producing interval) is comparable to short standard drill stem tests (DST). Accordingly, single dual packer drawdown and buildup tests are sometimes referred to as a mini-drill stem test, or mini-DST, instead of IPTT. Because these mini-DSTs generally have a flow interval of about 3.2 ft (or 1.0 meter), they usually behave as a limited-entry flow test from which both $k_v$ and $k_h$ may be determined under favorable conditions. Such favorable conditions may include observing both spherical and radial flow regimes, and also obtaining information relating to porosity and total compressibility. In a specific embodiment where only a spherical flow regime is developed, then spherical permeability $k_s$ may be determined. Permeability information obtained from packer transient analysis is typically an important factor relating to the initial permeability of the reservoir model.

Single Probe Mini-DST

In some cases a single probe may be used as the sink (e.g., producing probe). In such situations, the single probe makes a small version of a standard drill stem test (DST) that is known as a mini-drill stem test, or mini-DST. Since these mini-DSTs typically have a flow interval of only a few centimeters, they usually act as a limited-entry flow test from which both $k_h$ and $k_v$ may be determined under favorable conditions. Such favorable conditions may include observing both spherical and radial flow regimes, and also obtaining information relating to porosity and total compressibility. In a specific embodiment where only a spherical flow regime is developed, then spherical permeability $k_s$ may be determined. Permeability information obtained from packer transient analysis is typically an important factor relating to the initial permeability of reservoir model.

Figure 7:
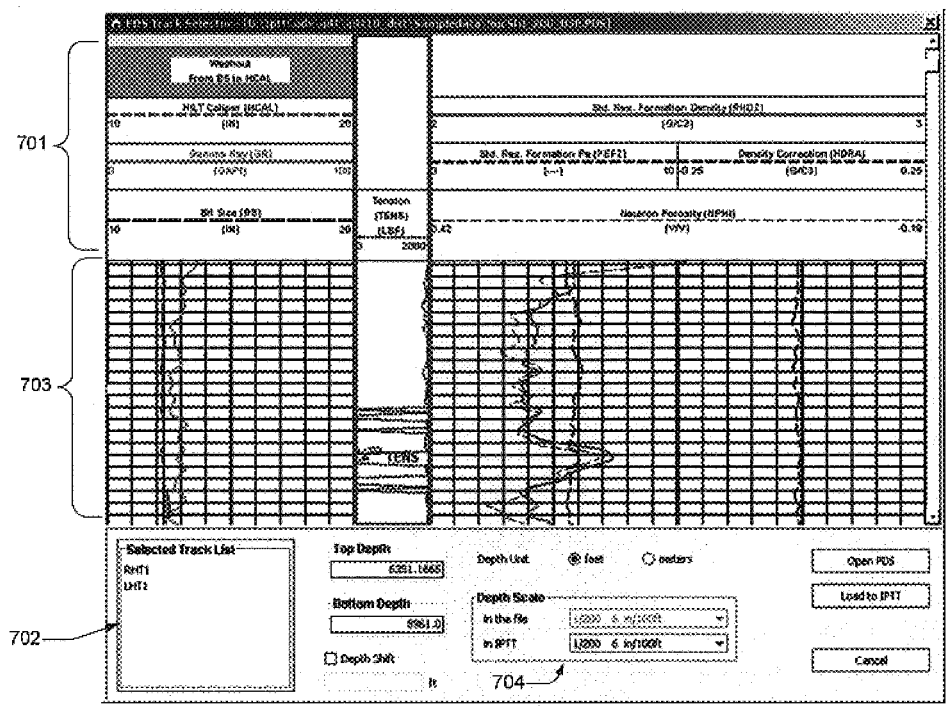
FIGS. 7-9 illustrate examples of different screenshots of a specific embodiment of the invention which may be used for implementing functionality relating to the Constructing Static And Dynamic Formation Model Process 118 and/or the Refining Formation Model And Parameters Process 120 of FIG. 1.
Figure 8:
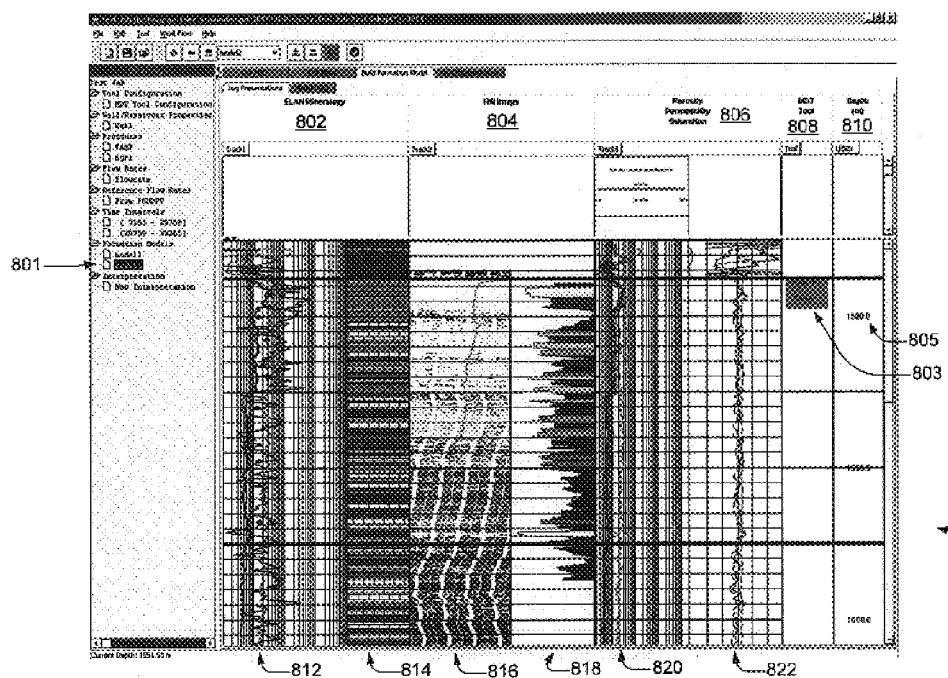
Figure 9:
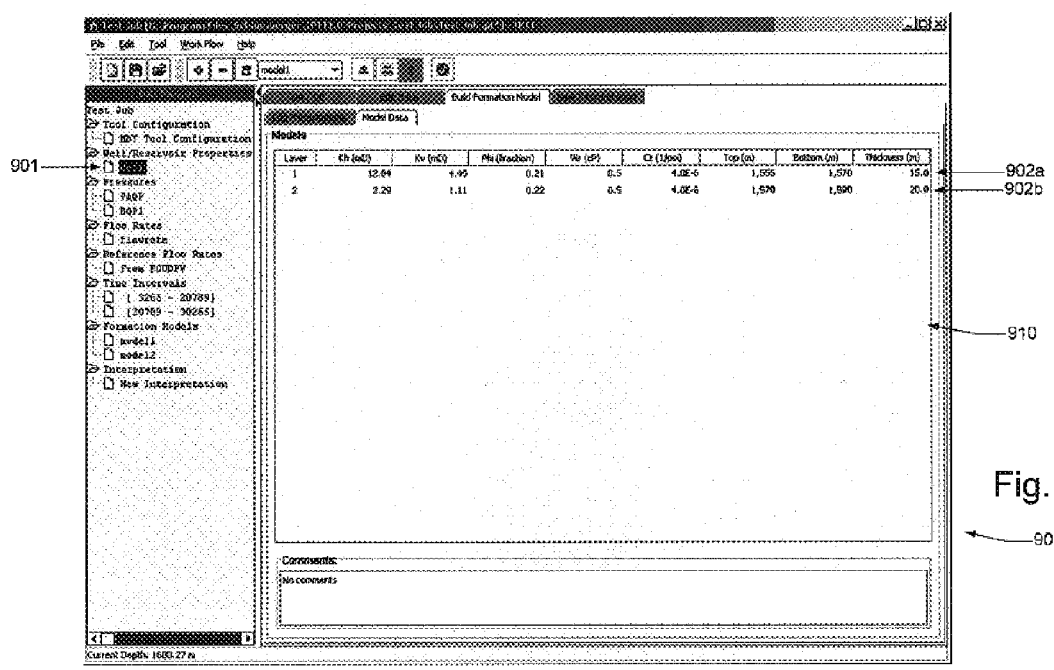

FIGS. 7-9 illustrate examples of different screenshots which may be used for implementing functionality relating to the Constructing Static And Dynamic Formation Model Process 118 and/or the Refining Formation Model And Parameters Process 120 of FIG. 1.

FIG. 7 illustrates an example of a GUI 700 configured or designed to provide functionality for loading formation logs from selected PDS (picture description standard) files. As illustrated in the example a FIG. 7, track selection window 702 may be provided for allowing a user to select one or more tracks from PDS files to load into the IPTT workflow process. According to a specific implementation, PDS formation log information may be represented in graphical format, as illustrated for example, in portions 701 and 703 of FIG. 7. Thus, for example, as illustrated in FIG. 7, the portions 701 and 703 of GUI 700 graphically represent content of selected PDS files. In at least one implementation, a depth scale window 704 may be provided for allowing the user to select a desired depth scale for the graphical information displayed in portions 701 and/or 703.

FIG. 8 illustrates an example of a GUI 800 configured or designed to provide functionality for defining and refining formation model information. It at least one implementation, GUI 800 may be configured or designed to allow the user to manipulate (e.g., add, delete, adjust, etc.) desired layer boundaries associated with PDS information such as, for example, the graphical information displayed in GUI 800.

In the example of FIG. 8, graphs 812, 814, 816, 818, 820, 822 represent log information obtained from different PDS files. Items 803 and 805 indicate the type and location of the formation tester tool(s) used to acquire the IPTT data. As illustrated in FIG. 8, GUI 800 may be configured or designed to display a variety of different types of log information such as, for example, ELAN mineralogy 802; FMI image 804; porosity, permeability, and saturation 806; tool information 808; depth information 810; etc.

FIG. 9 illustrates an example of a GUI 900 configured or designed to provide functionality for editing formation model information. As illustrated in FIG. 9, window 910 may be configured or designed to display a table showing formation parameters of each or selected layers (e.g., 902a, 902b) of desired formation models, and may also be configured or designed to allow the user to edit selected parameters within the table.

According to a specific implementation, parameters associated with a given layer may include, for example: top and bottom depth of the layer (which, for example, may be used to determine thickness and position relative to the tool); effective porosity ($\phi$) of the layer; effective horizontal permeability ($k_h$) of the layer; effective vertical permeability ($k_v$) of the layer; total compressibility ($c_t$) of the layer; effective viscosity ($\mu$) of the flowing fluid in the layer; etc.

Nonlinear Parameter Estimation

As illustrated in FIG. 1, the IPTT workflow technique of the present invention may include a Nonlinear Parameter Estimation (or Regression) Process 124 which may be configured or designed to perform a variety of operations such as, for example, history matching and/or other types of nonlinear regression. According to a specific implementation, the Nonlinear Parameter Estimation Process 124 may be configured or designed to use analytical and/or numerical models of formation models with unweighted least squares (UWLS), weighted least squares (WLS), and/or maximum likelihood (ML) regression techniques. In some instances, ML regression techniques may be preferred because they enable one to estimate error variances in pressure data along with the unknown formation parameters. According to different embodiments of the present invention, input parameters to the Nonlinear Parameter Estimation Process 124 may include: formation model information and associated parameters; well model information and associated parameters; well and reservoir parameters (e.g. formation pressures, damage skin factor, etc.); tool configuration data (such as, for example, formation tester or other testing tools); regression control parameters; etc. In at least one implementation, the initial parameter estimates of formation pressure, skin, and/or storage may be obtained from a variety of different sources such as, for example: Dynamic Data sources (e.g., 104); information provided by the System Identification Process (116); direct input from the user (according to his or her experience and knowledge); etc.

It will be appreciated that the efficiency of the non-linear regression algorithm and the reliability of the parameter estimates from the non-linear optimization may be influenced by the initial selection of parameters and their constraints (or variations/ranges). According to a specific embodiment, the non-linear optimization may be constrained by defining lower and upper limits for the parameters. The initial parameters of the constructed formation and well model may also be constrained, for example, by using different sources of information during the formation model construction and/or refining processes. Additionally, as noted previously, pressure, horizontal and vertical mobilities (and/or permeabilities if the viscosity is known), skin factor, and storage parameters may be uniquely estimated by using p-r and/or p-p convolution of different measurement combinations from packer module, sink, horizontal, vertical probes, and/or any combination thereof.

The inverse problem of estimating unknown formation parameters of the previously constructed formation and well model may be formulated as a nonlinear optimization problem, which may be solved analytically or numerically. For example, parameter estimation may be performed by using a weighted least square (WLS) algorithm (in which weights are assumed to be known) and/or a maximum likelihood (ML) estimation algorithm. Additionally, according to a specific implementation, minimization of objective functions may be achieved by using, for example, a Levenberg-Marquardt algorithm. In addition to the estimated parameters, statistics of the estimated parameters (including, for example, confidence intervals and/or correlation coefficients) may also be computed. Such statistics may prove useful, for example, in identifying or estimating the reliability of the estimated parameters based on the available data.

It will be appreciated that, if an un-weighted least square (UWLS) algorithm is used on data sets having disparate orders of magnitude, then the data sets with relatively large magnitudes will tend to dominate those having relatively small magnitudes with respect to estimation. As a result, information included in data sets with relatively small magnitudes may loose its significance. Moreover, in cases where some observations are less reliable than the others, it may be desirable to utilize parameter estimates that are less influenced by unreliable observations. In at least one implementation, this may be achieved by using a weighted least squares (WLS) regression algorithm. Because, it may be difficult to determine the error variance structure and, thus, to determine the proper weights to be used in the WLS regression, at least one embodiment of the IPTT workflow technique of the present invention utilizes a new efficient optimization technique based on a maximum likelihood (ML) estimation which, heretofore has not conventionally been used for multiprobe wireline formation tester interpretation and/or well testing.

One advantage of the MLE optimization technique of the present invention is that it reduces or eliminates the trial-and-error procedure typically required for determining appropriate weights to be used in the WLS estimation. Moreover, the optimization technique of the present invention provides significant improvement in parameter estimation when working with pressure data sets of disparate orders of magnitude and/or noise (e.g., pressure measurements for the packer/probe and multiprobe interval tests).

Occasionally, it may be difficult to obtain a reasonable match in a non-homogenous formation model with many unknowns after only one regression cycle. Accordingly, in at least one embodiment of the present invention an iterative procedure may be employed wherein different processes of the IPTT workflow are used to constrain and/or enhance model and parameter estimation. In this way, one is able to reduce uncertainties in the model and associated estimated parameters. According to a specific implementation, by using the parameter estimates and statistics (e.g. confidence interval and/or correlation coefficients) from the previous regression as inputs, the formation model may be iteratively refined and its parameters may be iteratively adjusted.

According to specific embodiments, when the results are unacceptable, for example, on mismatch of the observed data with model and statistics of estimated parameters, the formation model and/or other input parameters may be reexamined and modified, such as, for example, by: adjusting layers and/or boundaries; redefining selected layers; changing selected initial estimates of layers; etc. Parameters such as vertical and horizontal permeabilities/mobilities that have been estimated from the updated model may be useful for indicating or identifying acceptable controlling information which may be used for the next regression cycle.

According to a specific implementation, at the end of each regression cycle, if the model and estimated parameters are accepted, then the IPTT analysis procedure may be considered to be completed. In one embodiment, the output of the regression process may produce some or all of the following information: final estimates of parameters with confidence interval and statistics; permeability (Kv, Kh); formation damage (skin); formation pressure; storage; deconvolved flow rate; etc. Thereafter, in at least one implementation, the model and associated parameter information may be used to perform additional uncertainty analysis (if desired) using, for example, the Sensitivity And Uncertainty Analysis Process 124 illustrated in FIG. 1.

FIGS. 10-13 illustrate examples of different screenshots that may be used for implementing functionality relating to the Nonlinear Parameter Estimation Process 124 of FIG. 1.

Figure 10:
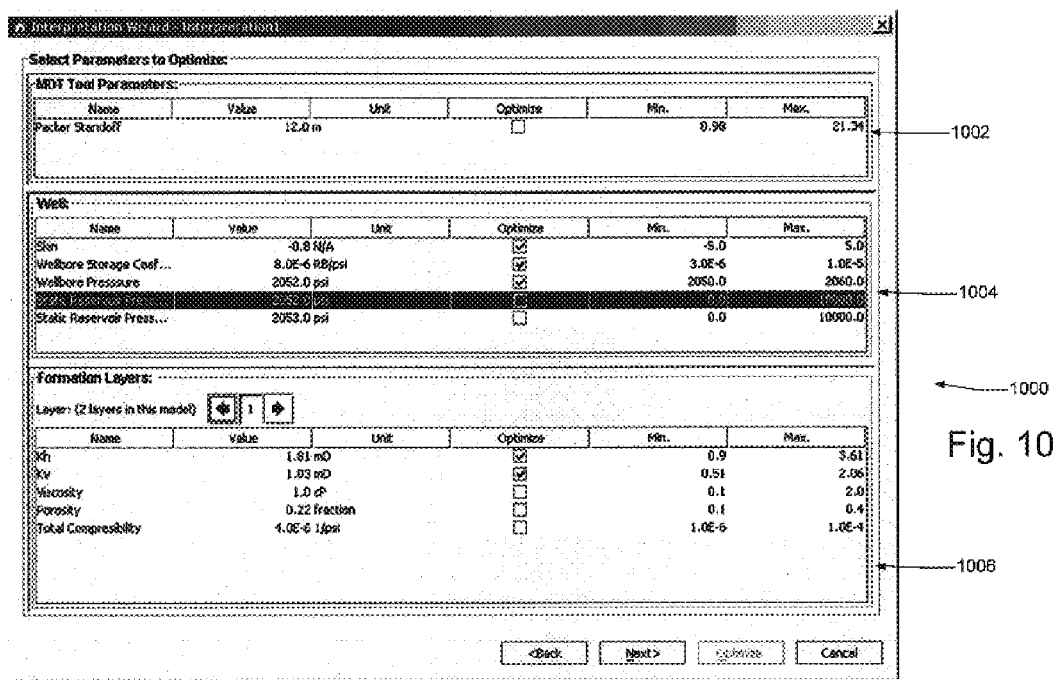
FIGS. 10-13 illustrate examples of different screenshots of a specific embodiment of the invention which may be used for implementing functionality relating to the Nonlinear Parameter Estimation Process 124 of FIG. 1.
Figure 11:
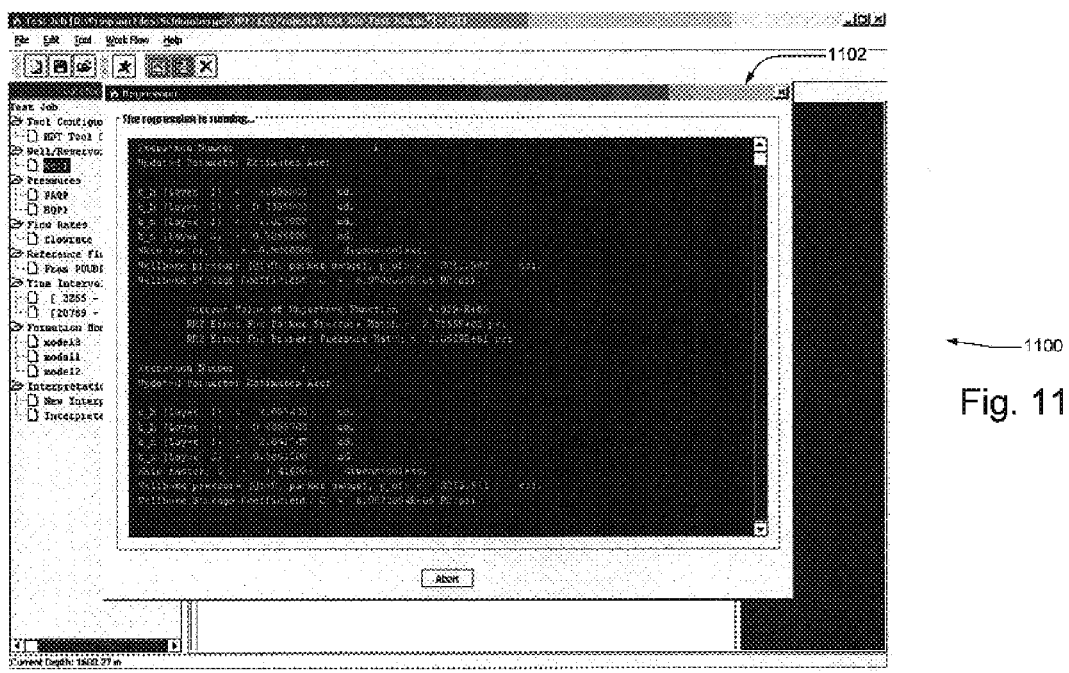

FIG. 10 illustrates an example of a GUI 1000 configured or designed to provide functionality for facilitating the user in determining optimized values for selected unknown parameters. As illustrated in the example of FIG. 10, GUI 1000 may include a plurality of different windows (e.g., 1002, 1004, 1006, etc.) for displaying information relating to possible unknown parameters. For example, in the embodiment of FIG. 10, window 1002 may be adapted to display known and/or possible unknown parameters relating to tool configurations; window 1004 may be adapted to display known and/or possible unknown parameters relating to well and reservoir properties; and window 1006 may be adapted to display known and/or possible unknown parameters relating to selected layers of the formation model.

According to a specific implementation, unknown or unacceptable parameters may be optimized during the regression processing if the user checks the "Optimize" checkbox(s) associated with those parameters. In one implementation, the user may set the min and max boundaries of each of the selected unknown parameter. The regression process may then attempt to automatically optimize the selected parameter(s) within the given ranges.

During the regression (or Nonlinear Parameter Estimation) Process, a window (e.g., 1102) may be displayed to the user indicating that the regression is running. According to a specific implementation, the window 1102 may be adapted to display optimization progress and/or status of the regression process.

Figure 12:
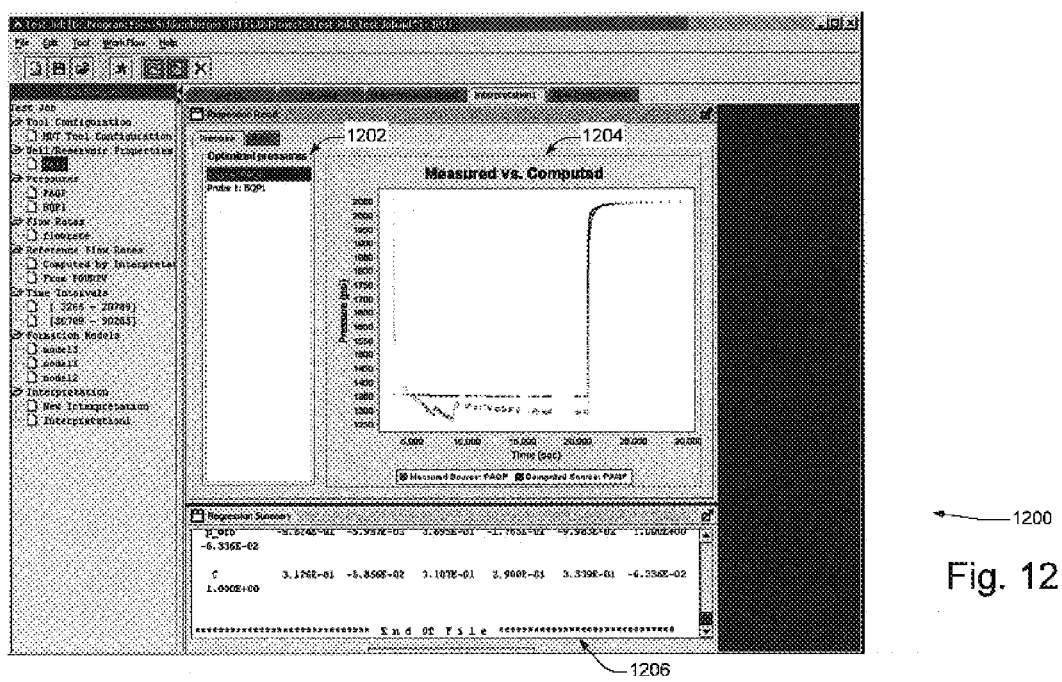

FIG. 12 illustrates an example of a GUI 1200 configured or designed to provide functionality relating to pressure-matching. As illustrated in the example of FIG. 12, GUI 1200 may be configured or designed to display a plurality of windows, including a pressure source selection window 1202, a plot comparison window 1204, a regression summary window 1206, etc. According to a specific implementation, source selection window 1202 may be adapted to display a list of all or selected pressures which were used in the optimization process. The plot comparison window 1204 may be adapted to display graphical representations of the measured pressure data from formation testers and the computed pressure obtained through the optimization process via the updated well-reservoir model. As illustrated in the example of FIG. 12, the two plots (e.g., measured pressure data versus optimized (e.g., computed) pressure values) may be overlaid together in order to allow the user to visually compare the measured pressure characteristics with the optimized pressure characteristics. In this way, the user may check and refine the initial estimates of the formation parameters, for example, if it is determined that the match of pressure plots is not satisfactory. In contrast, a satisfactory match of the two pressure plots may provide an indication of the correctness or accuracy of the formation model with its estimated parameters.

Figure 13:
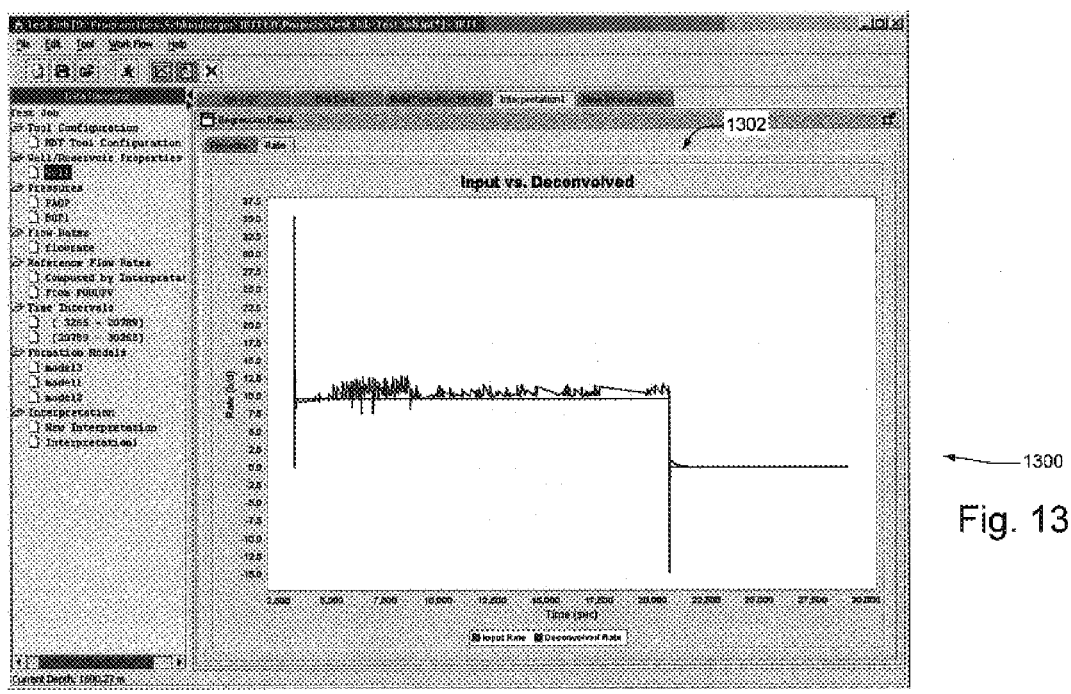

FIG. 13 illustrates an example of a GUI 1300 configured or designed to provide functionality relating to pressure and flow rate analysis. As illustrated in the example of FIG. 13, GUI 1300 may be configured or designed to display a regression result window 1302 for displaying graphical information relating to the input flow rate versus the deconvolved or extracted rate. According to a specific implementation, the deconvolved or extracted rate may be derived from pressure data calculated during the optimization process. In at least one implementation, if the initial model and other parameters are reasonably accurate, the deconvolved or extracted rate should substantially agree with the measured flow rate. In this way, the user may check and refine the initial estimates of the formation parameters, for example, if it is determined that the match of measured and deconvolved or extracted flow rate plots is not satisfactory. In contrast, a satisfactory match of the two plots may provide an indication of the correctness or accuracy of the formation model as well as estimated parameters.

Sensitivity and Uncertainty Analysis

As illustrated in FIG. 1, the IPTT workflow may include a Sensitivity And Uncertainty Analysis Process 124 that may be configured or designed to perform a sensitivity and uncertainty analysis. According to a specific implementation, the Sensitivity And Uncertainty Analysis Process 124 may be adapted to provide statistics about the estimation parameters, which may be used as an indication of the correctness of match and/or regression. It should be pointed out that, when providing solutions for inverse problems, it is important to understand: 1) the range of uncertainties in estimated parameters, and 2) how these uncertainties can affect the match between modeled and observed data. For example, uncertainties may arise from measurement errors and/or from input formation parameters such as porosity, viscosity and compressibility, layering, and heterogeneity of the formation, etc.

Although input parameters of the formation model may be estimated using the nonlinear regression techniques described above, one objective in conducting IPTT tests and performing data processing using interpretation software is to estimate the values and associated uncertainties of pressure, effective vertical and horizontal permeabilities and damage skin factor for each individual layer.

It will be appreciated that there may be multiple scenarios in which parameters can be optimized using the IPTT workflow of the present invention. For example, even though the determination of permeability and damage skin factor is one objective of performing an IPTT analysis, if the interpreter(s) (e.g., users) have sufficient knowledge or high confidence of permeabilities ($k_h$, $k_v$) of each layer and damage skin factor, the technique of the present invention may be used to optimize other formation parameters such as, for example, viscosity, compressibility, and porosity of each layer (or selected layers). Additionally, the IPTT workflow technique of the present invention may also be used estimate other model parameters such as, for example, fluid properties (e.g., by fixing the above parameters). Accordingly, it will be appreciated that the IPTT workflow technique of the present invention allows the interpreter(s) to have the flexibility to optimize different parameter combinations as desired.

It will be appreciated that the graphical user interface (GUI) based IPTT workflow technique of the present invention preferably provides an integrated user-friendly interpretation platform for analyzing formation testing pressures and flow rate measurements in order to estimate the values and associated uncertainties of local characteristics of a hydrocarbon reservoir such as, for example, local permeability, local reservoir pressure, local compressibility, etc. Additionally, the GUI based software of the present invention significantly reduces the amount of time needed to generate such estimated information—in many cases by many hours. For example, using conventional (e.g., DOS based) techniques, it may take a user several days to obtain the desired estimations of local reservoir characteristics, whereas the same results may be achieved within the several hours using the GUI based IPTT workflow technique of the present invention.

OTHER EMBODIMENTS

Generally, the IPTT workflow techniques of the present invention may be implemented in software and/or on hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

Software or software/hardware hybrid implementation of the IPTT workflow techniques of this invention may be implemented on a general-purpose programmable machine selectively activated or reconfigured by a computer program stored in memory. Such programmable machine may be implemented on a general-purpose network host machine such as a personal computer or workstation. Further, the invention may be at least partially implemented on a card (e.g., an interface card) for a network device or a general-purpose computing device.

Figure 14:
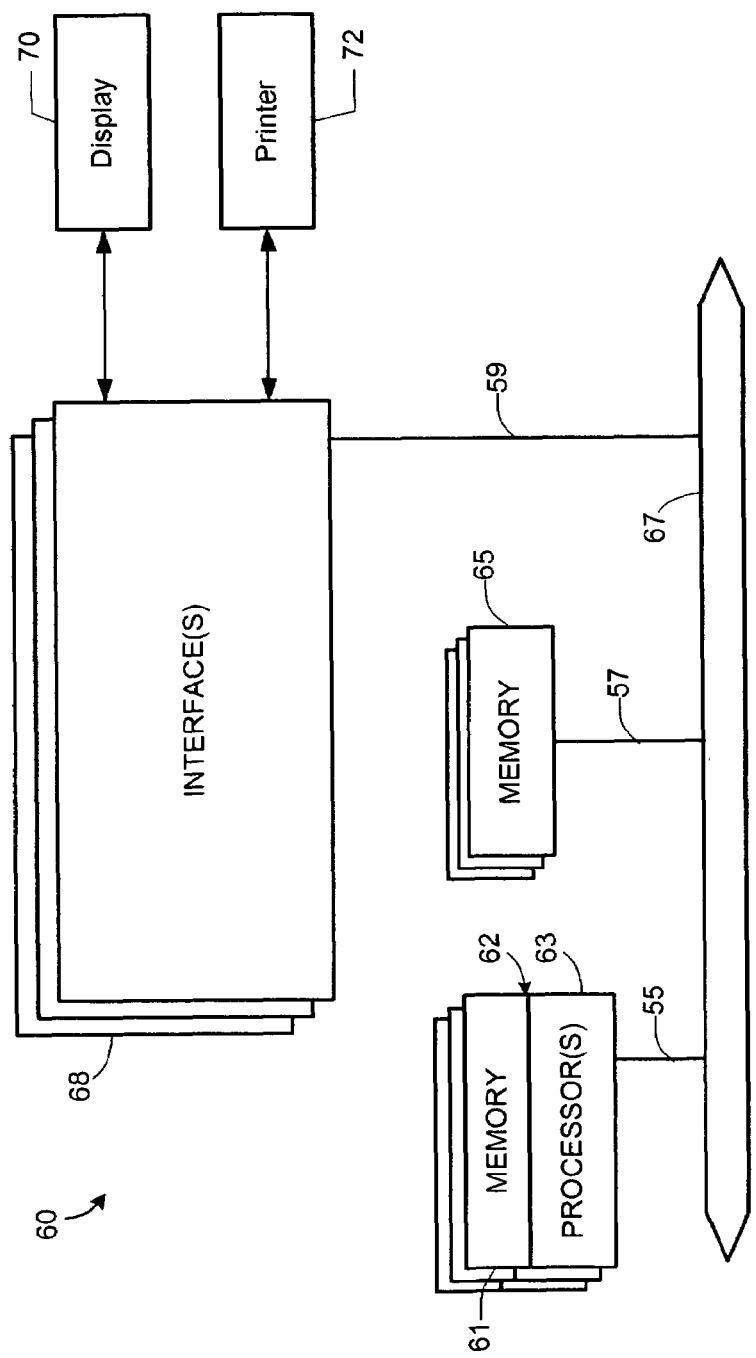
FIG. 14 shows an example of a network device 60 suitable for implementing various aspects of the IPTT workflow procedure of the present invention.

Referring to FIG. 14, a network device 60 suitable for implementing various aspects of the IPTT workflow techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a general-purpose computing device, the CPU 62 may be responsible for data processing, media management, I/O communication, etc. The CPU 62 preferably accomplishes all these functions under the control of software including an operating system (e.g. Windows NT), and any appropriate applications software.

CPU 62 may include one or more processors 63 such as a processor from the Motorola or Intel family of microprocessors, or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60, such as, for example, display devices 70 and/or printing devices 72. It will be appreciated that the various IPTT workflow techniques of the present invention may generate data or other information to be presented for display on electronic display devices and/or non-electronic display devices (such as, for example, printed for display on paper).

Examples of other types of interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may be used, for example, to handle data processing tasks, display tasks, communication tasks, media control tasks, etc.

Although the system shown in FIG. 14 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the IPTT workflow techniques described herein. The program instructions may control the operation of an operating system and/or one or more applications, for example. The memory or memories may also be configured to store data structures, logging information, IPTT workflow related information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims. For example, although the embodiments described herein have been primarily directed to hydrocarbon reservoirs the invention is not so limited. Those of skill in the art will appreciate that the invention is also readily applicable to other types of underground reservoirs. An example of another type of fluid bearing reservoir that the invention is readily applicable to is subterranean water reservoirs and water layers.

The invention claimed is:

1. A computer implemented method for calculating characteristics of a hydrocarbon reservoir comprising:
    receiving pressure data representing local pressure measurements obtained at one or more locations along at least one borehole traversing the hydrocarbon reservoir;
    receiving user input from a user via a first graphical user interface;
    calculating, based at least in part on the pressure data and the user input, at least one of the following local characteristics of the hydrocarbon reservoir: local permeability, local reservoir pressure, and local compressibility; and
    displaying output generated using the at least one local characteristic.

2. The method of claim 1 wherein the pressure data includes a first portion of pressure data representing local pressure measurements obtained with a wireline formation tester.

3. The method of claim 1 wherein the pressure data includes a first portion of pressure data representing local pressure measurements obtained with a logging while drilling or measurement while drilling tool.

4. The method of claim 1 wherein the pressure data includes a first portion of pressure data representing local pressure measurements obtained at multiple locations along a first borehole traversing the hydrocarbon reservoir.

5. The method of claim 1 wherein the pressure data includes a first portion of pressure data representing local pressure measurements obtained at a first location along a first borehole traversing the hydrocarbon reservoir, and obtained at a second location along a second borehole traversing the hydrocarbon reservoir.

6. The method of claim 1 further comprising:
receiving nuclear magnetic resonance (NMR) data associated with NMR measurements obtained at one or more locations along at least one borehole traversing the hydrocarbon reservoir;
wherein the calculation of at least one of said local characteristics is also based at least in part on at least a portion of the received NMR data.

7. The method of claim 1 further comprising:
receiving resistivity imaging data associated with resistivity imaging measurements obtained at one or more locations along at least one borehole traversing the hydrocarbon reservoir;
wherein the calculation of at least one of said local characteristics is based at least in part on at least a portion of the received resistivity imaging data.

8. The method of claim 1 further comprising:
receiving dynamic data associated with measurements obtained at one or more locations along at least one borehole traversing the hydrocarbon reservoir;
the dynamic data including at least a portion of the following: pretest survey data from formation testers, well testing data, multiple phase information from downhole fluid analysis (DFA), production logging data, and reservoir saturation tool (RST) data;
wherein the calculation of at least one of said local characteristics is based at least in part on at least a portion of the received dynamic data.

9. The method of claim 1 further comprising:
receiving other input parameters including at least one of the following additional input parameters: formation model information and associated parameters, well model information and associated parameters, well and reservoir parameters, tool configuration data, and history matching control parameters;
wherein the calculation of at least one of said local characteristics is based at least in part on at least one of the additional input parameters.

10. The method of claim 1 wherein the first graphical user interface includes functionality for facilitating the user in performing data processing operations;
wherein the data processing operations include one or more of the following operations:
removing superfluous data, denoising or noise filtering, rate manipulating, constructing or reconstructing missing information, and decimating; and
wherein at least a portion of the user input corresponds to instructions relating to data processing operations.

11. The method of claim 1 wherein the first graphical user interface includes functionality for facilitating the user in performing system identification operations;
wherein the system identification operations include one or more of the following operations: derivative operations, Pressure-Pressure deconvolution operations, Pressure-Flow Rate deconvolution, and flow regime analysis; and
wherein at least a portion of the user input corresponds to instructions relating to system identification operations.

12. The method of claim 1 wherein the first graphical user interface includes functionality for facilitating the user in performing formation modeling operations;
wherein at least a portion of the user input corresponds to instructions relating to formation modeling operations; and
wherein the formation modeling operations are used to generate formation model information relating one or more of the following formation characteristics: formation layer depth, effective porosity, effective horizontal permeability, effective vertical permeability, total compressibility, and effective viscosity.

13. The method of claim 1 wherein the first graphical user interface includes functionality for facilitating the user in performing nonlinear parameter estimation operations;
wherein at least a portion of the user input corresponds to instructions relating to nonlinear parameter estimation operations; and
wherein the nonlinear parameter estimation operations include one or more of the following operations: adjusting estimates of at least one formation layer parameter, adjusting estimates of at least one formation layer boundary, redefining one or more selected formation layers, and changing selected initial estimates of at least one formation layer.

14. The method of claim 1 further comprising:
generating formation model information relating to at least one estimated formation model of the hydrocarbon reservoir;
wherein the calculation of at least one of said local characteristics is based at least in part on at least a portion of the formation model information.

15. The method of claim 1 further comprising:
generating formation model information relating to at least one estimated formation model of the hydrocarbon reservoir; and
reducing uncertainties in the model and associated estimated parameters by performing nonlinear parameter estimation on the formation model information.

16. The method of claim 1 wherein the first graphical user interface includes functionality for facilitating the user in performing quality control analysis operations on input data; and
wherein at least a portion of the user input corresponds to instructions relating to quality control analysis operations.

17. The method of claim 1 wherein the first graphical user interface includes functionality for facilitating the user in performing data validation operations; and
wherein at least a portion of the user input corresponds to instructions relating to data validation operations.

18. The method of claim 1 wherein the first graphical user interface includes functionality for facilitating the user in performing operations relating to computing flow rate data from pumpout volume data.

19. The method of claim 1 wherein the first graphical user interface includes functionality for facilitating the user in performing operations relating to validating data quality from formation testing tool measurements.

20. The method of claim 1 wherein the first graphical user interface includes functionality for facilitating the user in performing operations relating to modifying pressure data points.

21. The method of claim 1 wherein the first graphical user interface includes functionality for facilitating the user in performing operations relating to defining time intervals for data points.

22. The method of claim 1 wherein the first graphical user interface includes functionality for facilitating the user in performing operations relating to editing a flow rate value.

23. The method of claim 1 wherein the first graphical user interface includes functionality for facilitating the user in performing operations relating to performing nonlinear optimization using a maximum likelihood method for simultaneous estimation of selected unknown parameters.

24. The method of claim 1 wherein the first graphical user interface includes functionality for facilitating the user in performing operations relating to setting options to control nonlinear optimization operations.

25. The method of claim 1 wherein the first graphical user interface includes functionality for facilitating the user in performing operations relating to saving a job file which includes pressure, flow rate, formation model and interpretation result information relating to the hydrocarbon reservoir.

26. A system for calculating characteristics of a hydrocarbon reservoir comprising:
   at least one processor;
   a display for displaying at least one graphical user interface (GUI);
   at least one user input device configured or designed to receive input for a user; and memory;
   the system being configured or designed to receive pressure data representing local pressure measurements obtained at one or more locations along at least one borehole traversing the hydrocarbon reservoir;
   the system being configured or designed to receive user input from a user via a first graphical user interface;
   the system being configured or designed to calculate, based at least in part on the pressure data and the user input, at least one of the following local characteristics of the hydrocarbon reservoir: local permeability, local reservoir pressure, and local compressibility;
   the system being configured or designed to display output generated using the at least one local characteristic.

27. The system of claim 26 wherein the pressure data includes a first portion of pressure data representing local pressure measurements obtained with a wireline formation tester.

28. The system of claim 26 wherein the pressure data includes a first portion of pressure data representing local pressure measurements obtained with a logging while drilling or measurement while drilling tool.

29. The system of claim 26 wherein the pressure data includes a first portion of pressure data representing local pressure measurements obtained at multiple locations along a first borehole traversing the hydrocarbon reservoir.

30. The system of claim 26 wherein the pressure data includes a first portion of pressure data representing local pressure measurements obtained at a first location along a first borehole traversing the hydrocarbon reservoir, and obtained at a second location along a second borehole traversing the hydrocarbon reservoir.

31. The system of claim 26 being further configured or designed to:
   receive NMR data associated with NMR measurements obtained at one or more locations along at least one borehole traversing the hydrocarbon reservoir;
   wherein the calculation of at least one of said local characteristics is also based at least in part on at least a portion of the received NMR data.

32. The system of claim 26 being further configured or designed to:
   receive resistivity imaging data associated with resistivity imaging measurements obtained at one or more locations along at least one borehole traversing the hydrocarbon reservoir;
   wherein the calculation of at least one of said local characteristics is based at least in part on at least a portion of the received resistivity imaging data.

33. The system of claim 26 being further configured or designed to:
   receive dynamic data associated with measurements obtained at one or more locations along at least one borehole traversing the hydrocarbon reservoir;
   the dynamic data including at least a portion of the following: pretest survey data from formation testers, well testing data, multiple phase information from downhole fluid analysis (DFA), production logging data, and reservoir saturation tool (RST) data;
   wherein the calculation of at least one of said local characteristics is based at least in part on at least a portion of the received dynamic data.

34. The system of claim 26 being further configured or designed to:
   receive other input parameters including at least one of the following additional input parameters: formation model information and associated parameters, well model information and associated parameters, well and reservoir parameters, tool configuration data, and history matching control parameters;
   wherein the calculation of at least one of said local characteristics is based at least in part on at least one of the additional input parameters.

35. The system of claim 26 wherein the GUI includes functionality for facilitating the user in performing data processing operations;
   wherein the data processing operations include one or more of the following operations:
   removing superfluous data, denoising or noise filtering, rate manipulating, constructing or reconstructing missing information, and decimating; and
   wherein at least a portion of the user input corresponds to instructions relating to data processing operations.

36. The system of claim 26 wherein the GUI includes functionality for facilitating the user in performing system identification operations;
   wherein the system identification operations include one or more of the following operations: derivative operations, Pressure-Pressure deconvolution operations, Pressure-Flow Rate deconvolution, and flow regime analysis; and
   wherein at least a portion of the user input corresponds to instructions relating to system identification operations.

37. The system of claim 26 wherein the GUI includes functionality for facilitating the user in performing formation modeling operations;
   wherein at least a portion of the user input corresponds to instructions relating to formation modeling operations; and
   wherein the formation modeling operations are used to generate formation model information relating one or more of the following formation characteristics: formation layer depth, effective porosity, effective horizontal permeability, effective vertical permeability, total compressibility, and effective viscosity.

38. The system of claim 26 wherein the GUI includes functionality for facilitating the user in performing nonlinear parameter estimation operations;
- wherein at least a portion of the user input corresponds to instructions relating to nonlinear parameter estimation operations; and
- wherein the nonlinear parameter estimation operations include one or more of the following operations: adjusting estimates of at least one formation layer parameter, adjusting estimates of at least one formation layer boundary, redefining one or more selected formation layers, and changing selected initial estimates of at least one formation layer.

39. The system of claim 26 being further configured or designed to:
- generate formation model information relating to at least one estimated formation model of the hydrocarbon reservoir;
- wherein the calculation of at least one of said local characteristics is based at least in part on at least a portion of the formation model information.

40. The system of claim 26 being further configured or designed to:
- generate formation model information relating to at least one estimated formation model of the hydrocarbon reservoir; and
- reduce uncertainties in the model and associated estimated parameters by performing nonlinear parameter estimation on the formation model information.

41. The system of claim 26 wherein the GUI includes functionality for facilitating the user in performing quality control analysis operations on input data; and
- wherein at least a portion of the user input corresponds to instructions relating to quality control analysis operations.

42. The system of claim 26 wherein the GUI includes functionality for facilitating the user in performing data validation operations; and
- wherein at least a portion of the user input corresponds to instructions relating to data validation operations.

43. The system of claim 26 wherein the GUI includes functionality for facilitating the user in performing operations relating to computing flow rate data from pumpout volume data.

44. The system of claim 26 wherein the GUI includes functionality for facilitating the user in performing operations relating to validating data quality from formation testing tool measurements.

45. The system of claim 26 wherein the GUI includes functionality for facilitating the user in performing operations relating to modify pressure data points.

46. The system of claim 26 wherein the GUI includes functionality for facilitating the user in performing operations relating to defining time intervals for data points.

47. The system of claim 26 wherein the GUI includes functionality for facilitating the user in performing operations relating to editing a flow rate value.

48. The system of claim 26 wherein the GUI includes functionality for facilitating the user in performing operations relating to performing nonlinear optimization using a maximum likelihood system for simultaneous estimation of selected unknown parameters.

49. The system of claim 26 wherein the GUI includes functionality for facilitating the user in performing operations relating to setting options to control nonlinear optimization operations.

50. The system of claim 26 wherein the GUI includes functionality for facilitating the user in performing operations relating to saving a job file which includes pressure, flow rate, formation model and interpretation result information relating to the hydrocarbon reservoir.

51. A computer readable medium comprising a computer program for calculating characteristics of a hydrocarbon reservoir, wherein the program having computer readable code for:
- receiving pressure data representing local pressure measurements obtained at one or more locations along at least one borehole traversing the hydrocarbon reservoir;
- receiving user input from a user via a first graphical user interface;
- calculating, based at least in part on the pressure data and the user input, at least one of the following local characteristics of the hydrocarbon reservoir: local permeability, local reservoir pressure, and local compressibility; and
- displaying output generated using the at least one local charateristic.

52. A system for calculating characteristics of a hydrocarbon reservoir comprising:
- means for receiving pressure data representing local pressure measurements obtained at one or more locations along at least one borehole traversing the hydrocarbon reservoir;
- means for receiving user input from a user via a first graphical user interface;
- means for calculating, based at least in part on the pressure data and the user input, at least one of the following local characteristics of the hydrocarbon reservoir: local permeability, local reservoir pressure, and local compressibility;
- means for displaying output generated using the at least one local characteristic.

* * * * *